(12) United States Patent
Lee et al.

(10) Patent No.: US 12,219,598 B2
(45) Date of Patent: Feb. 4, 2025

(54) METHOD AND APPARATUS FOR COEXISTENCE OF SIDELINK COMMUNICATIONS RELATED TO DIFFERENT RATS IN NR V2X

(71) Applicant: LG ELECTRONICS INC., Seoul (KR)

(72) Inventors: Seungmin Lee, Seoul (KR); Hanbyul Seo, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 857 days.

(21) Appl. No.: 17/265,493

(22) PCT Filed: Aug. 9, 2019

(86) PCT No.: PCT/KR2019/010090
§ 371 (c)(1),
(2) Date: Feb. 2, 2021

(87) PCT Pub. No.: WO2020/032698
PCT Pub. Date: Feb. 13, 2020

(65) Prior Publication Data
US 2021/0204307 A1 Jul. 1, 2021

Related U.S. Application Data

(60) Provisional application No. 62/739,072, filed on Sep. 28, 2018, provisional application No. 62/717,005, filed on Aug. 10, 2018.

(51) Int. Cl.
*H04W 72/566* (2023.01)
*H04W 4/40* (2018.01)
*H04W 92/18* (2009.01)

(52) U.S. Cl.
CPC ............ *H04W 72/569* (2023.01); *H04W 4/40* (2018.02); *H04W 92/18* (2013.01)

(58) Field of Classification Search
CPC ...... H04W 72/569; H04W 4/40; H04W 92/18
See application file for complete search history.

(56) References Cited

U.S. PATENT DOCUMENTS 11,540,097 B2 * 12/2022 Park .................... H04B 7/15592
11,632,727 B2 * 4/2023 Ryu ........................ H04W 4/40
370/329

(Continued)

FOREIGN PATENT DOCUMENTS

EP 3282798 2/2018
WO 2017150957 9/2017

(Continued)

OTHER PUBLICATIONS

European Patent Office Application Serial No. 19846418.2, Search Report dated Aug. 6, 2021, 8 pages.

(Continued)

*Primary Examiner* — Huy D Vu
*Assistant Examiner* — Robert Ma
(74) *Attorney, Agent, or Firm* — LEE, HONG, DEGERMAN, KANG & WAIMEY

(57) ABSTRACT

Provided are a method for performing sidelink transmission by a first apparatus (100) and an apparatus for supporting same. The method may comprise steps of: determining to perform first sidelink transmission related to LTE and second sidelink transmission related to NR; and performing any one of the first sidelink transmission or the second sidelink transmission on the basis of a priority order of the first sidelink transmission and a priority order of the second sidelink transmission.

17 Claims, 33 Drawing Sheets

(56) References Cited

U.S. PATENT DOCUMENTS

| | | | | |
|---|---|---|---|---|
| 2020/0053743 | A1* | 2/2020 | Cheng | H04W 4/40 |
| 2020/0229194 | A1* | 7/2020 | Belleschi | H04L 5/0064 |
| 2020/0314915 | A1* | 10/2020 | Lin | H04W 72/56 |
| 2021/0345360 | A1* | 11/2021 | Yeo | H04W 72/20 |
| 2021/0385821 | A1* | 12/2021 | Yeo | H04W 72/0446 |

FOREIGN PATENT DOCUMENTS

| | | | |
|---|---|---|---|
| WO | 2018135905 | 7/2018 | |
| WO | WO-2018135905 A1 * | 7/2018 | H04L 5/001 |

OTHER PUBLICATIONS

Zte et al., "Coexistence between NR V2X and LTE V2X," 3GPP TSG RAN WG1 Meeting #95, R1-1813178, Nov. 2018, 4 pages.

Nec, "Discussion on coexistence between NR and LTE sidelinks," 3GPP TSG RAN WG1 #96, R1-1902696, Feb-Mar. 2019, 3 pages.

LG Electronics Inc., "On the coexistence scope of potential Rel-16 NR V2X study item," 3GPP TSG-RAN Meeting #80, RP-180950, Jun. 2018, 7 pages.

Huawei et al., "Discussion on remaining issues for SUL and EN-DC," 3GPP TSG RAN WG1 Meeting #92bis, RI-1803656, Apr. 2018, 7 pages.

LG Electronics, "Remaining issues in NR LTE coexistence," 3GPP TSG RAN WG1 Meeting NR#3, R1-1715904, Sep. 2017, 9 pages.

\* cited by examiner (a)

(b)

(a)

(b)

METHOD AND APPARATUS FOR COEXISTENCE OF SIDELINK COMMUNICATIONS RELATED TO DIFFERENT RATS IN NR V2X

CROSS-REFERENCE TO RELATED APPLICATIONS

This application is the National Stage filing under 35 U.S.C. 371 of International Application No. PCT/KR2019/010090, filed on Aug. 9, 2019, which claims the benefit of U.S. Provisional Application Nos. 62/717,005 filed on Aug. 10, 2018, and 62/739,072 filed on Sep. 28, 2018, the contents of which are all incorporated by reference herein in their entirety.

BACKGROUND OF THE DISCLOSURE

Field of the Disclosure

The present disclosure relates to a wireless communication system.

Related Art

A wireless communication system is a multiple access system that supports communication of multiple users by sharing available system resources (e.g., a bandwidth, transmission power, and so on) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Meanwhile, a wireless communication system needs to estimate an uplink channel or downlink channel for data transmission/reception, system synchronization acquisition, channel information feedback, and so on. In a wireless communication system environment, fading occurs due to multi path time latency. A process of recovering a transmission signal by compensating distortion in a signal, which is caused by an abrupt environment change due to fading, is referred to as channel estimation. Additionally, a channel state for a cell to which the UE belongs or another cell needs to be measured. For channel estimation or channel state measurement, channel estimation is generally performed by using a reference signal (RS), which is mutually known between transceivers.

A UE may perform measurement using the following three methods.

1) Reference signal received power (RSRP): RSRP indicates the average received power of all resource elements (REs) carrying CRSs transmitted over the entire band. Here, the UE may measure the average received power of all REs carrying channel state information (CSI) RSs instead of CRSs.

2) Received signal strength indicator (RSSI): RSSI indicates received power measured over the entire band. RSSI includes all of a signal, interference, and thermal noise.

3) Reference symbol received quality (RSRQ): RSRQ indicates a channel quality indicator (CQI) and may be determined as RSRP/RSSI depending on a bandwidth or a subband. That is, RSRQ refers to signal-to-interference-plus-noise-ratio (SINR). Since RSRP does not provide sufficient mobility information, RSRQ may be used instead of RSRP in a handover or cell reselection process.

RSRQ may be calculated by RSSI/RSSP. Alternatively, RSRQ may be calculated by N*RSSI/RSSP. Here, N may be a parameter (for example, the number of PRBs) or a function related to a bandwidth in which RSSI is measured.

Meanwhile, sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive MTC, Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

Technical Objects

Meanwhile, a method for efficiently coexisting sidelink communication related to heterogeneous RAT needs to be proposed.

Technical Solutions

According to an embodiment, provided herein is a method for performing, by a first device (100), sidelink transmission. The method may include the steps of determining to perform a first sidelink transmission related to LTE and a second sidelink transmission related to NR, and performing one of the first sidelink transmission and the second sidelink transmission, based on a priority of the first sidelink transmission and a priority of the second sidelink transmission.

According to another embodiment, provided herein is a first device (100) performing sidelink communication. The first device (100) may include one or more memories, one or more transceivers, and one or more processors being operatively connected to the one or more memories and the one or more transceivers, wherein the one or more processors are configured to determine to perform a first sidelink transmission related to LTE and a second sidelink transmission related to NR, and to control the one or more transceivers so as to perform one of the first sidelink transmission and the second sidelink transmission, based on a priority of the first sidelink transmission and a priority of the second sidelink transmission.

Effects of the Disclosure

NR SL and LTE SL may efficiently coexist.

DESCRIPTION OF EXEMPLARY EMBODIMENTS

In this document, the term "I" and "," should be interpreted to indicate "and/or". For instance, the expression "A/B" may mean "A and/or B". Further, "A, B" may mean "A and/or B". Further, "A/B/C" may mean "at least one of A, B, and/or C". Also, "A, B, C" may mean "at least one of A, B, and/or C".

Further, in the document, the term "or" should be interpreted to indicate "and/or". For instance, the expression "A or B" may comprise 1) only A, 2) only B, and/or 3) both A and B. In other words, the term "or" in this document should be interpreted to indicate "additionally or alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A, which is a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present disclosure will not be limited only to this.

Figure 1:
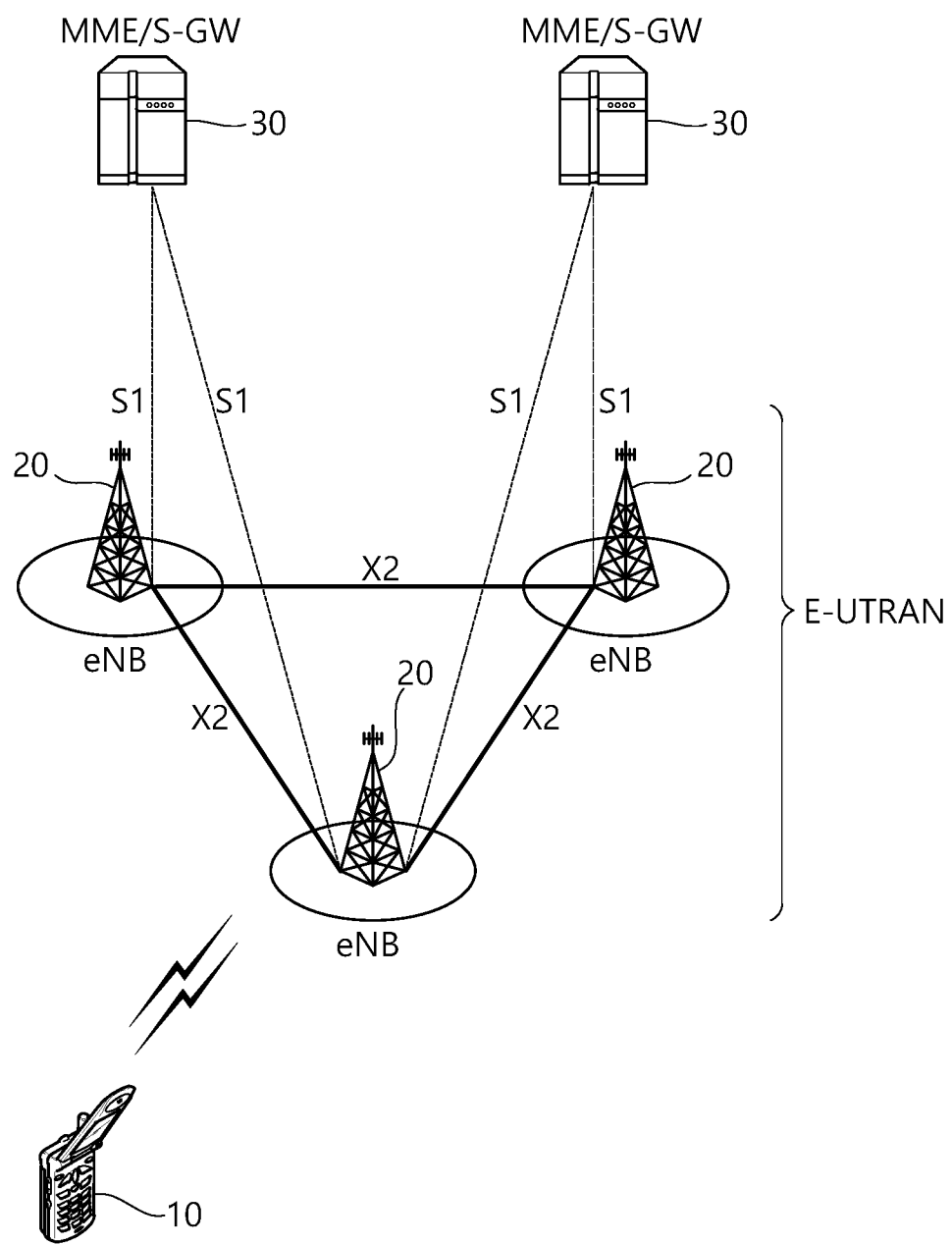
FIG. 1 shows a structure of an LTE system to which an exemplary embodiment of the present disclosure can be applied.

FIG. 1 shows a structure of an LTE system to which an exemplary embodiment of the present disclosure can be applied. This may also be referred to as an Evolved-UMTS Terrestrial Radio Access Network (E-UTRAN), or a Long Term Evolution (LTE)/LTE-A system.

Referring to FIG. 1, the E-UTRAN includes a base station (BS) (20), which provides a control plane and a user plane to a user equipment (UE) (10). The UE (10) may be fixed or mobile and may also be referred to by using different terms, such as Mobile Station (MS), User Terminal (UT), Subscriber Station (SS), Mobile Terminal (MT), wireless device, and so on. The base station (20) refers to a fixed station that communicated with the UE (10) and may also be referred to by using different terms, such as evolved-NodeB (eNB), Base Transceiver System (BTS), Access Point (AP), and so on.

The base stations (20) are interconnected to one another through an X2 interface. The base stations (20) are connected to an Evolved Packet Core (EPC) (30) through an S1 interface. More specifically, the base stations (20) are connected to a Mobility Management Entity (MME) through an S1-MME interface and connected to Serving Gateway (S-GW) through an S1-U interface.

The EPC (30) is configured of an MME, an S-GW, and a Packet Data Network-Gateway (P-GW). The MME has UE access information or UE capability information, and such information may be primarily used in UE mobility management. The S-GW is a gateway having an E-UTRAN as its endpoint. And, the P-GW is a gateway having a PDN as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 2:
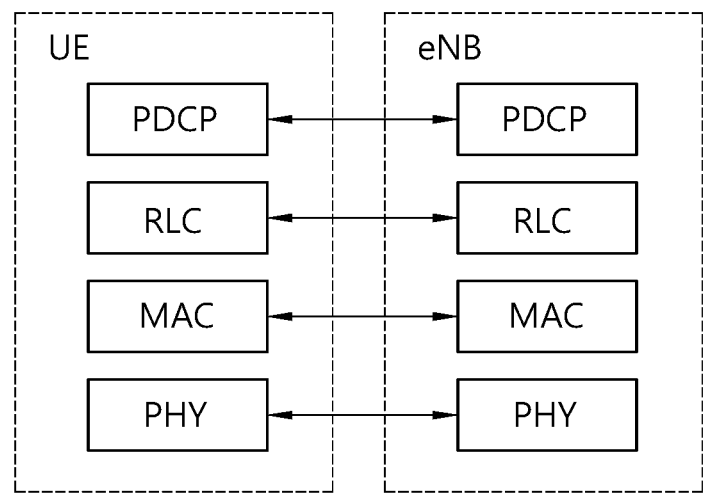
FIG. 2 shows a radio protocol architecture of a user plane to which an exemplary embodiment of the present disclosure can be applied.
Figure 3:
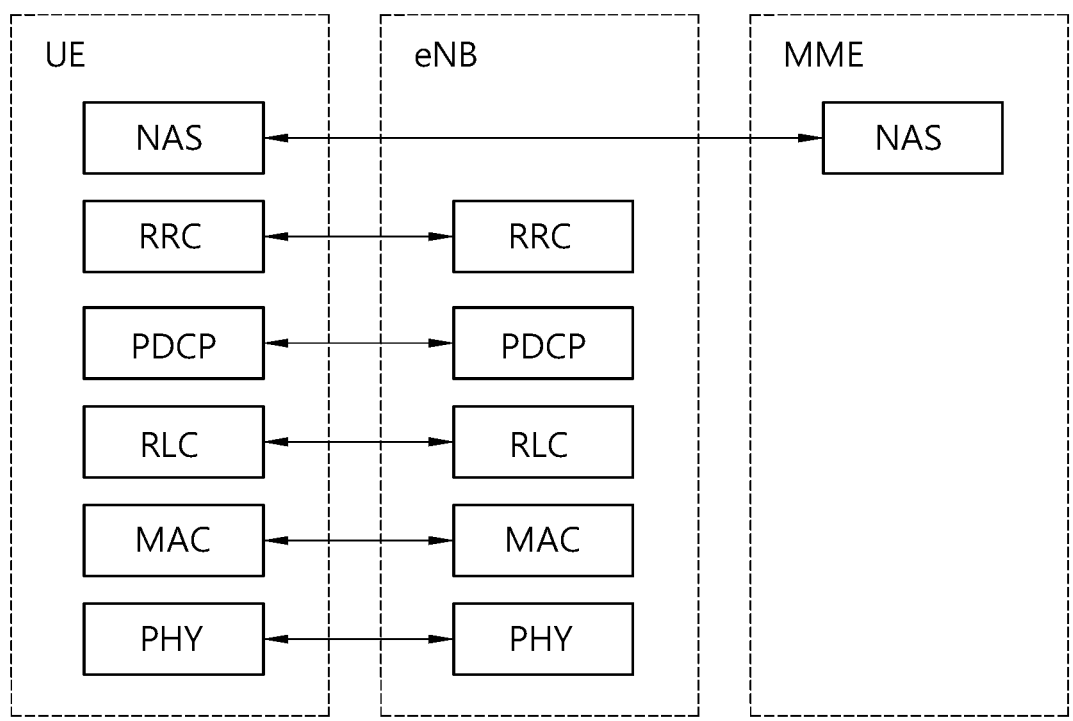
FIG. 3 shows a radio protocol architecture of a control plane to which an exemplary embodiment of the present disclosure can be applied.

FIG. 2 shows a radio protocol architecture of a user plane to which an exemplary embodiment of the present disclosure can be applied. FIG. 3 shows a radio protocol architecture of a control plane to which an exemplary embodiment of the present disclosure can be applied. The user plane is a protocol stack for user data transmission, and the control plane is a protocol stack for control signal transmission.

Referring to FIG. 2 and FIG. 3, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of RLC SDU. In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, reconfiguration, and release of radio bearers. The RB refers to a logical path being provided by the first layer (PHY layer) and the second layer (MAC layer, RLC layer, PDCP layer) in order to transport data between the UE and the network.

Functions of a Packet Data Convergence Protocol (PDCP) in the user plane include transfer, header compression, and ciphering of user data. Functions of a Packet Data Convergence Protocol (PDCP) in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH)

transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of subcarriers in the frequency domain. One subframe is configured of a plurality of OFDM symbols in the time domain. A resource block is configured of a plurality of OFDM symbols and a plurality of subcarriers in resource allocation units. Additionally, each subframe may use specific subcarriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 4:
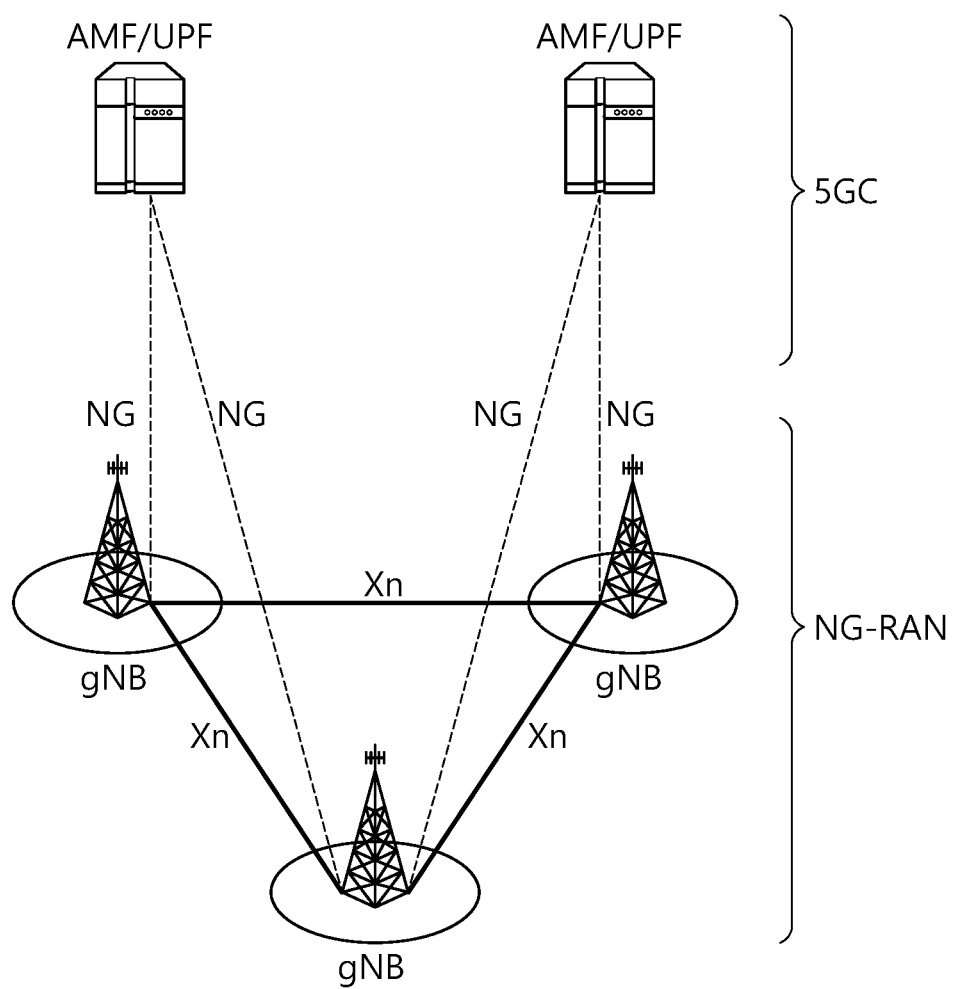
FIG. 4 shows a structure of an NR system to which an exemplary embodiment of the present disclosure can be applied.

FIG. 4 shows a structure of an NR system to which an exemplary embodiment of the present disclosure can be applied.

Referring to FIG. 4, an NG-RAN may include a gNB and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
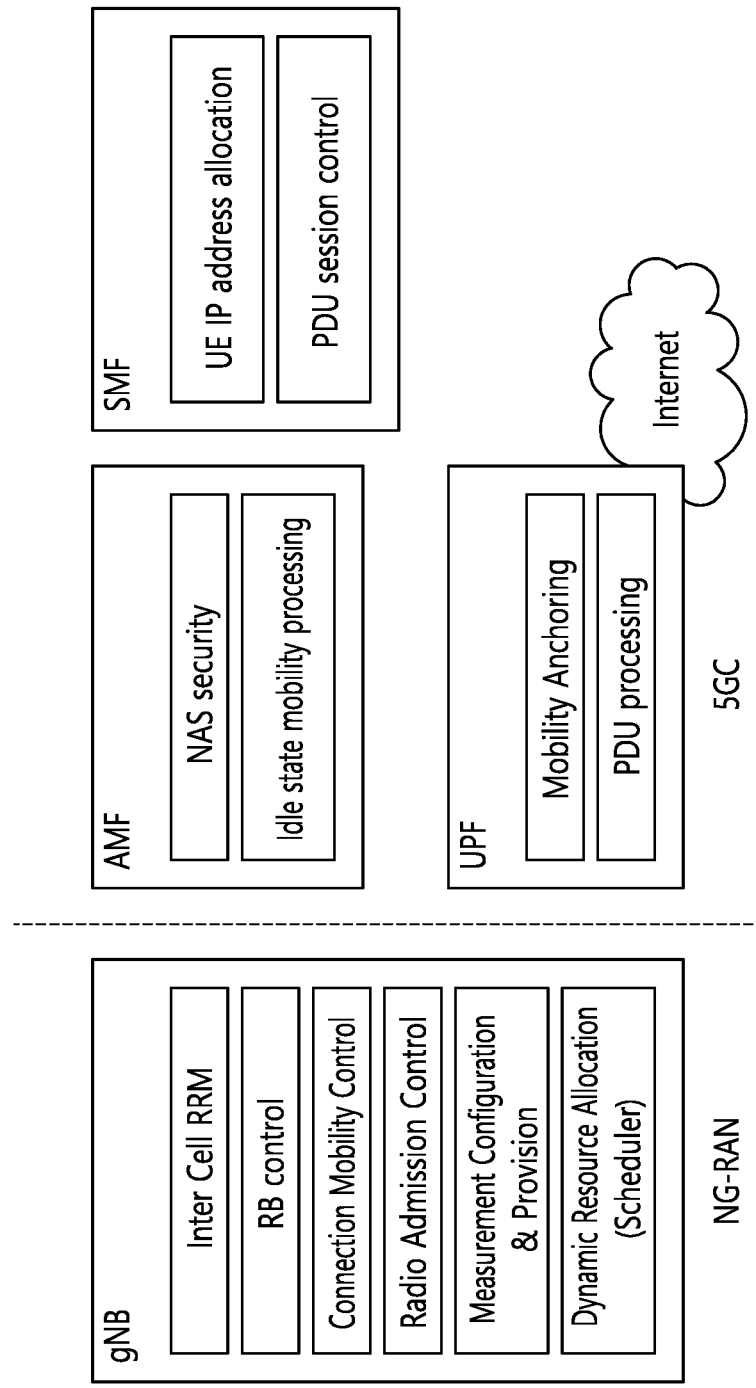
FIG. 5 shows a functional division between an NG-RAN and a 5GC to which an exemplary embodiment of the present disclosure can be applied.

FIG. 5 shows a functional division between an NG-RAN and a 5GC to which an exemplary embodiment of the present disclosure can be applied.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as NAS security, Idle state mobility processing, and so on. A UPF may provide functions, such as Mobility Anchoring, PDU processing, and so on. A Session Management Function (SMF) may provide functions, such as user equipment (UE) IP address allocation, PDU session control, and so on.

Figure 6:
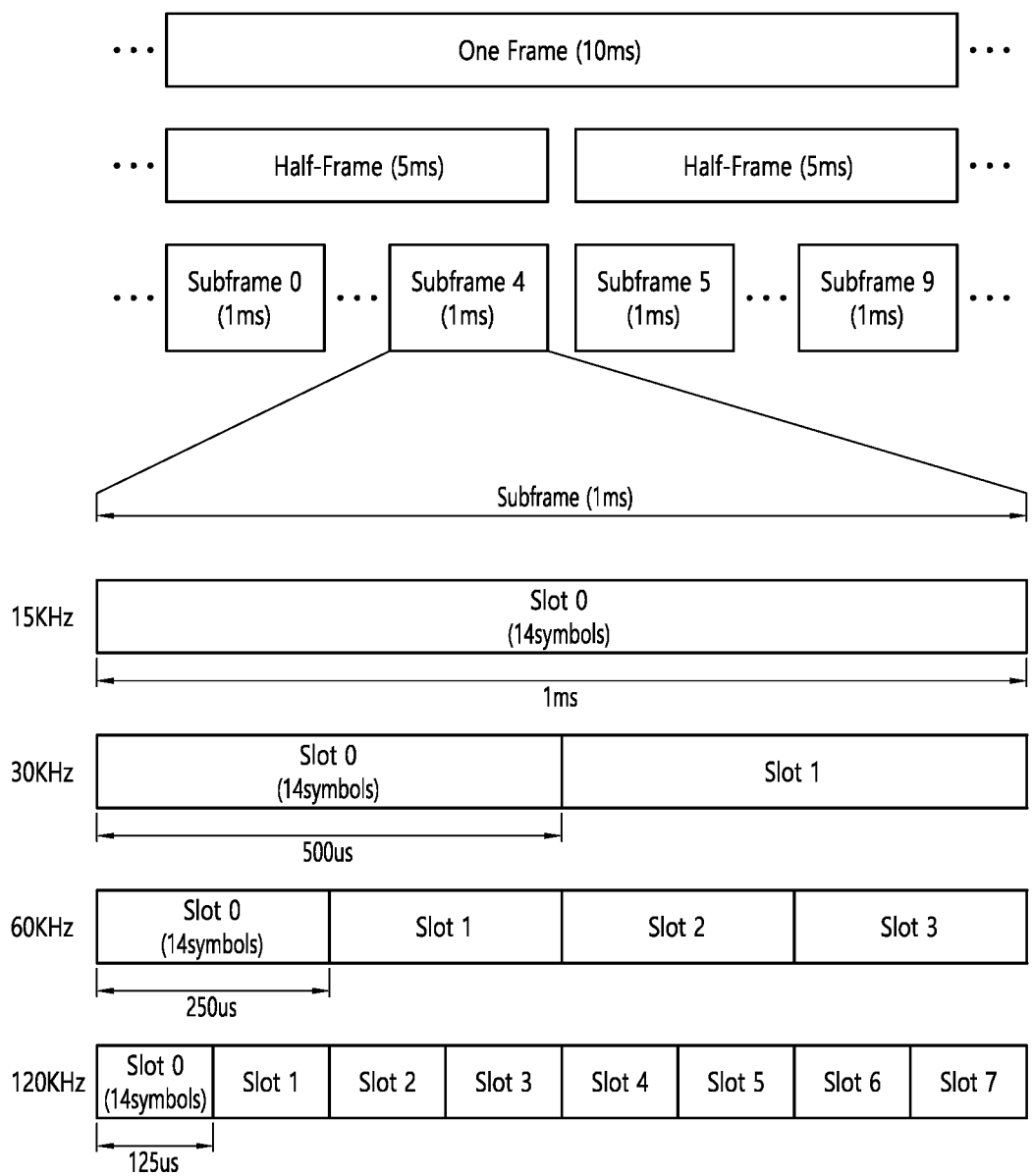
FIG. 6 shows a structure of a radio frame of an NR to which an exemplary embodiment of the present disclosure can be applied.

FIG. 6 shows a structure of a radio frame of an NR to which an exemplary embodiment of the present disclosure can be applied.

Referring to FIG. 6, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and an SC-FDMA symbol (or DFT-s-OFDM symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

Figure 7:
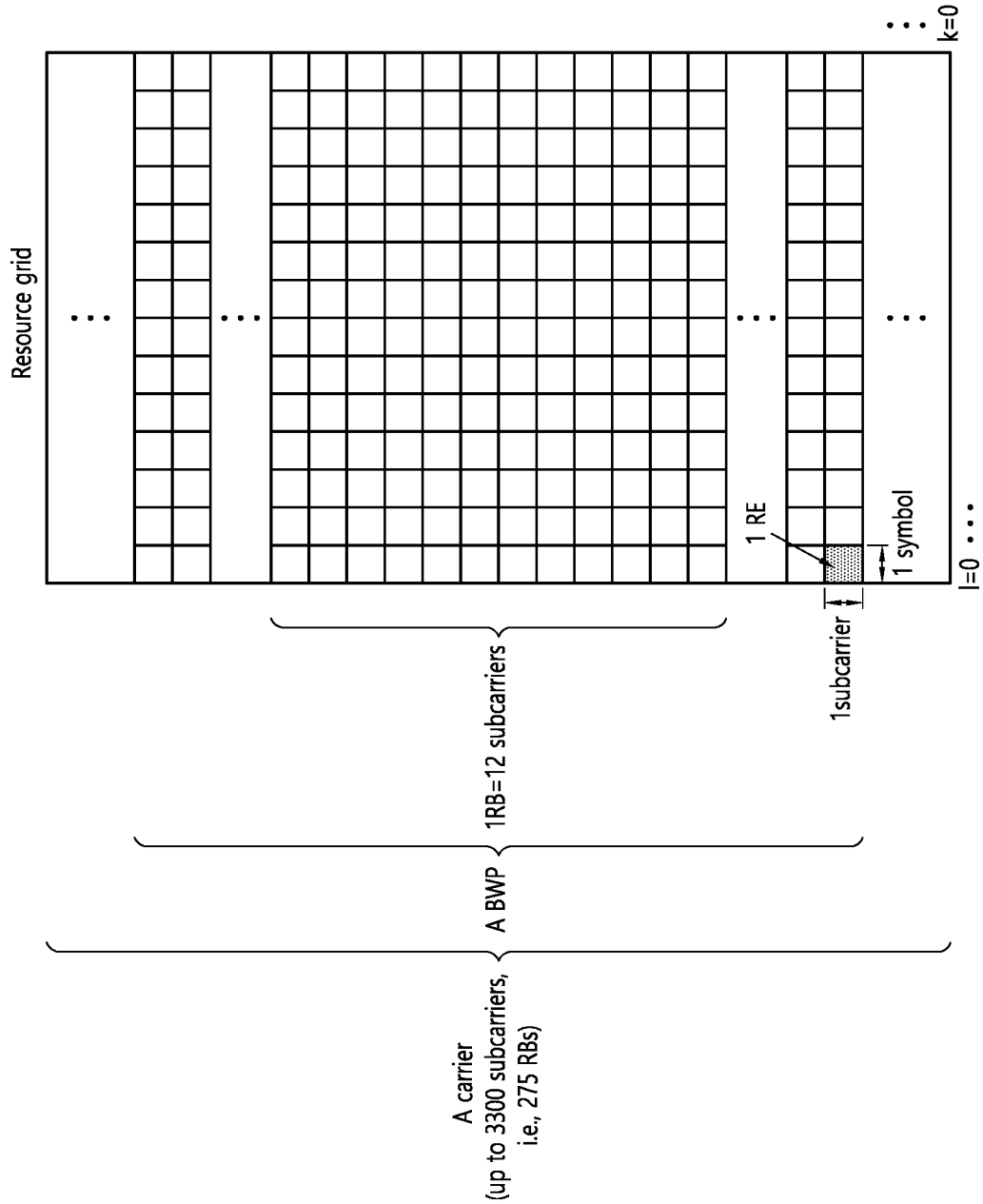
FIG. 7 shows a structure of a slot of an NR frame to which an exemplary embodiment of the present disclosure can be applied.

FIG. 7 shows a structure of a slot of an NR frame to which an exemplary embodiment of the present disclosure can be applied.

Referring to FIG. 7, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (P)RBs in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a consecutive set of physical resource blocks (PRBs) in a given numerology. The PRB may be selected from a consecutive subset of common resource blocks (CRBs) for a given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a location change of the bandwidth, or a change in subcarrier spacing of the bandwidth.

For example, the bandwidth may be decreased during a period in which activity is low to save power. For example, the location of the bandwidth may move in a frequency domain. For example, the location of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be referred to as a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive a PDCCH, a PDSCH, or a CSI-RS (however, an RRM is excluded) outside the active DL BWP. For example, the UE may not trigger a CSI report for an inactive DL BWP. For example, the UE may not transmit a PUCCH or a PUSCH outside the active UL BWP. For example, in a downlink case, the initial BWP may be given as a consecutive RB set for an RMSI CORESET (configured by a PBCH). For example, in an uplink case, the initial BWP may be given by an SIB for a random access procedure. For example, the default BWP may be configured by a higher layer. For example, an initial value of the default BWP may be an initial DL BWP. For energy saving, if the UE cannot detect DCI for a specific period of time, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 8:
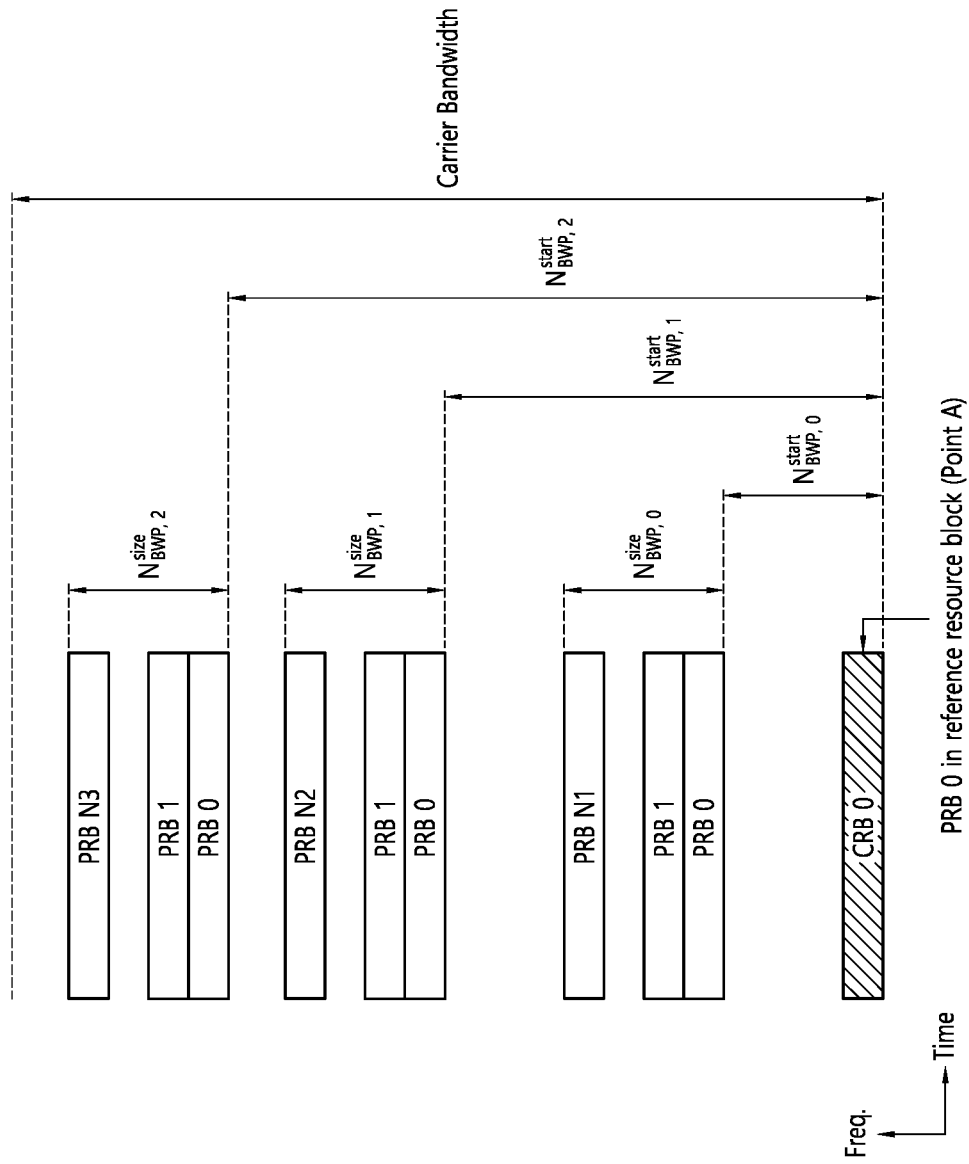
FIG. 8 shows a BWP to which an exemplary embodiment of the present disclosure can be applied.

FIG. 8 shows a BWP to which an exemplary embodiment of the present disclosure can be applied. It is assumed in the embodiment of FIG. 8 that the number of BWPs is 3.

Referring to FIG. 8, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or sidelink communication will be described in detail.

Figure 9:
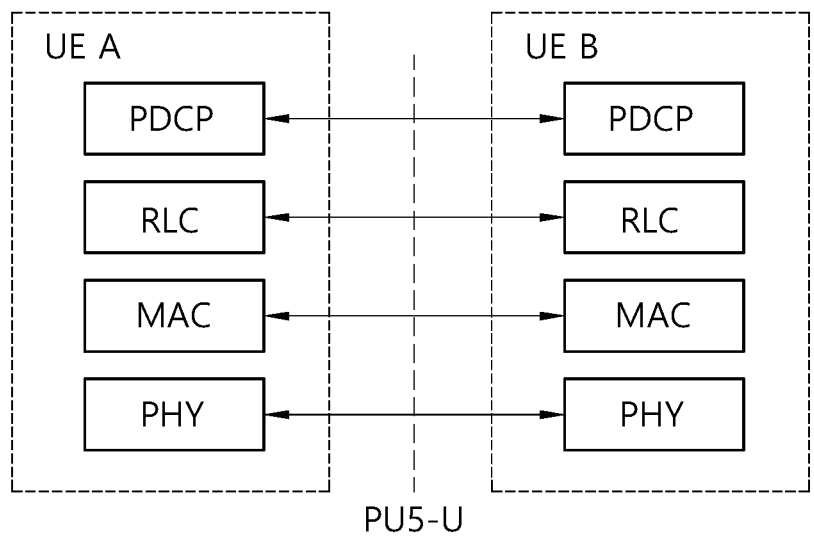
FIG. 9 shows a protocol stack for a sidelink communication to which the exemplary embodiment of the present disclosure can be applied.
Figure 9:
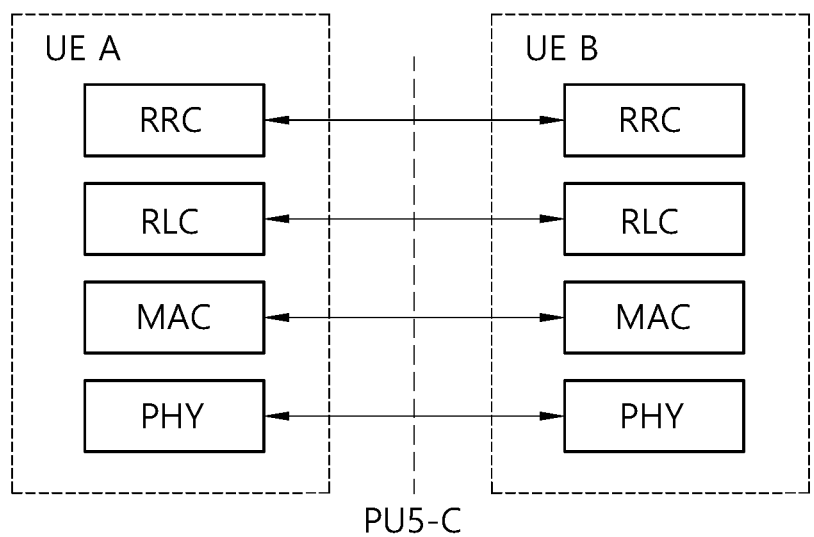

FIG. 9 shows a protocol stack for a sidelink communication to which the exemplary embodiment of the present disclosure can be applied. More specifically, (a) of FIG. 9 represents a user plane protocol stack of LTE, and (b) of FIG. 9 represents a control plane protocol stack of LTE.

Figure 10:
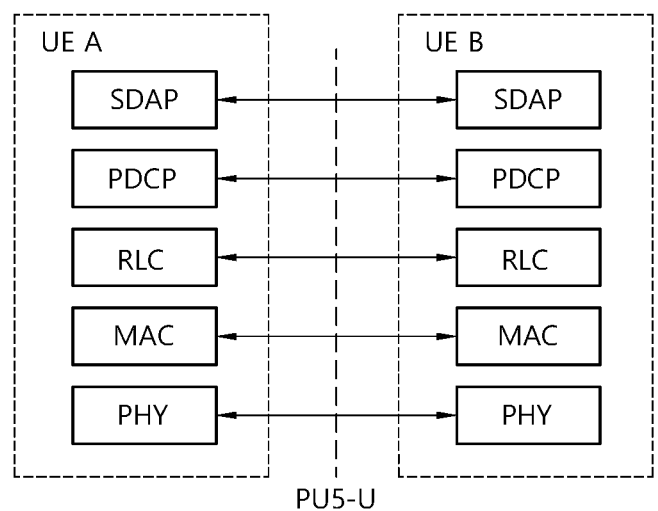
FIG. 10 shows a protocol stack for a sidelink communication to which the exemplary embodiment of the present disclosure can be applied.
Figure 10:
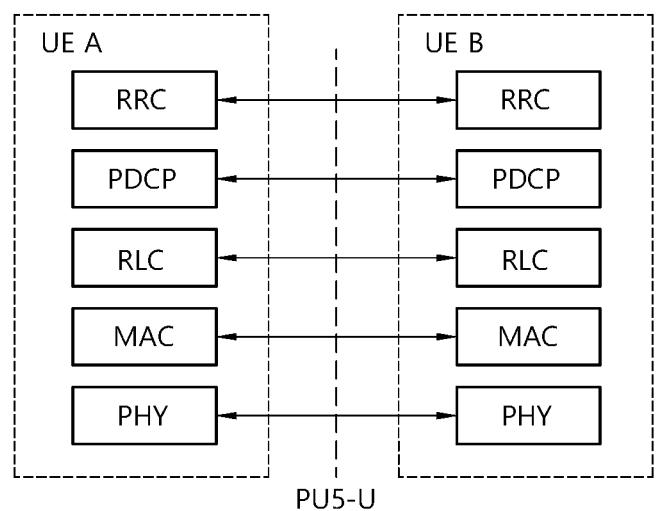

FIG. 10 shows a protocol stack for a sidelink communication to which the exemplary embodiment of the present disclosure can be applied. More specifically, (a) of FIG. 10 represents a user plane protocol stack of NR, and (b) of FIG. 10 represents a control plane protocol stack of NR.

Hereinafter, Sidelink Synchronization Signal (SLSS) and synchronization information will be described in detail.

SLSS is a sidelink specific sequence, which may include a Primary Sidelink Synchronization Signal (PSSS) and a Secondary Sidelink Synchronization Signal (SSSS). The PSSS may also be referred to as a Sidelink Primary Synchronization Signal (S-PSS), and the SSSS may also be referred to as a Sidelink Secondary Synchronization Signal (S-SSS).

A Physical Sidelink Broadcast Channel (PSBCH) may be a (broadcast) channel through which basic (system) information that should first be known by the user equipment (UE) before transmitting and receiving sidelink signals is transmitted. For example, the basic information may be information related to SLSS, a Duplex mode (DM), TDD UL/DL configuration, information related to a resource pool, application types related to SLSS, a subframe offset, broadcast information, and so on.

The S-PSS, the S-SSS, and the PSBCH may be included in a block format (e.g., a sidelink SS/PSBCH block, hereinafter referred to as S-SSB). The S-SSB may have the same numerology (i.e., SCS and CP length) as a Physical Sidelink Control Channel (PSCCH)/Physical Sidelink Shared Channel (PSSCH) within the carrier, and a transmission bandwidth may exist within a (pre)configured SL BWP. And, a frequency position of the S-SSB may be (pre)configured. Therefore, the UE is not required to perform a hypothesis detection in order to discover the S-SSB in the carrier.

Each SLSS may have a physical layer sidelink synchronization identity (ID), and the respective value may be equal to any one value ranging from 0 to 335. Depending upon any one of the above-described values that is used, a synchronization source may also be identified. For example, values of 0, 168, 169 may indicate global navigation satellite systems (GNSS), values from 1 to 167 may indicate base stations, and values from 170 to 335 may indicate that the source is outside of the coverage. Alternatively, among the physical layer sidelink synchronization ID values, values 0 to 167 may be values being used by a network, and values from 168 to 335 may be values being used outside of the network coverage.

Figure 11:
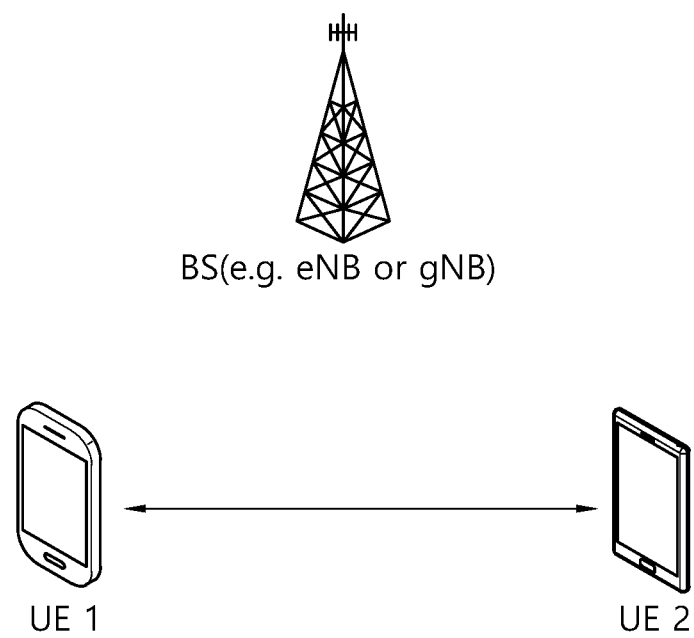
FIG. 11 shows a UE performing V2X or sidelink communication to which an exemplary embodiment of the present disclosure can be applied.

FIG. 11 shows a UE performing V2X or sidelink communication to which an exemplary embodiment of the present disclosure can be applied.

Referring to FIG. 11, in V2X/sidelink communication, the term terminal may mainly refer to a terminal (or equipment) used by a user. However, in case a network equipment, such as a base station, transmits and receives signals in accordance with a communication scheme between the network equipment and a user equipment (UE) (or terminal), the base station may also be viewed as a type of user equipment (or terminal).

User equipment 1 (UE1) may select a resource unit corresponding to a specific resource within a resource pool, which refers to a set of resources, and UE1 may then be operated so as to transmit a sidelink signal by using the corresponding resource unit. User equipment 2 (UE2), which is a receiving UE, may be configured with a resource pool to which UE1 can transmit signals, and may then detect signals of UE1 from the corresponding resource pool.

Herein, in case UE1 is within a connection range of the base station, the base station may notify the resource pool. Conversely, in case UE1 is outside connection range of the base station, another UE may notify the resource pool or a predetermined resource may be used.

Generally, a resource pool may be configured in a plurality of resource units, and each UE may select one resource unit or a plurality of resource units and may use the selected resource unit(s) for its sidelink signal transmission.

Figure 12:
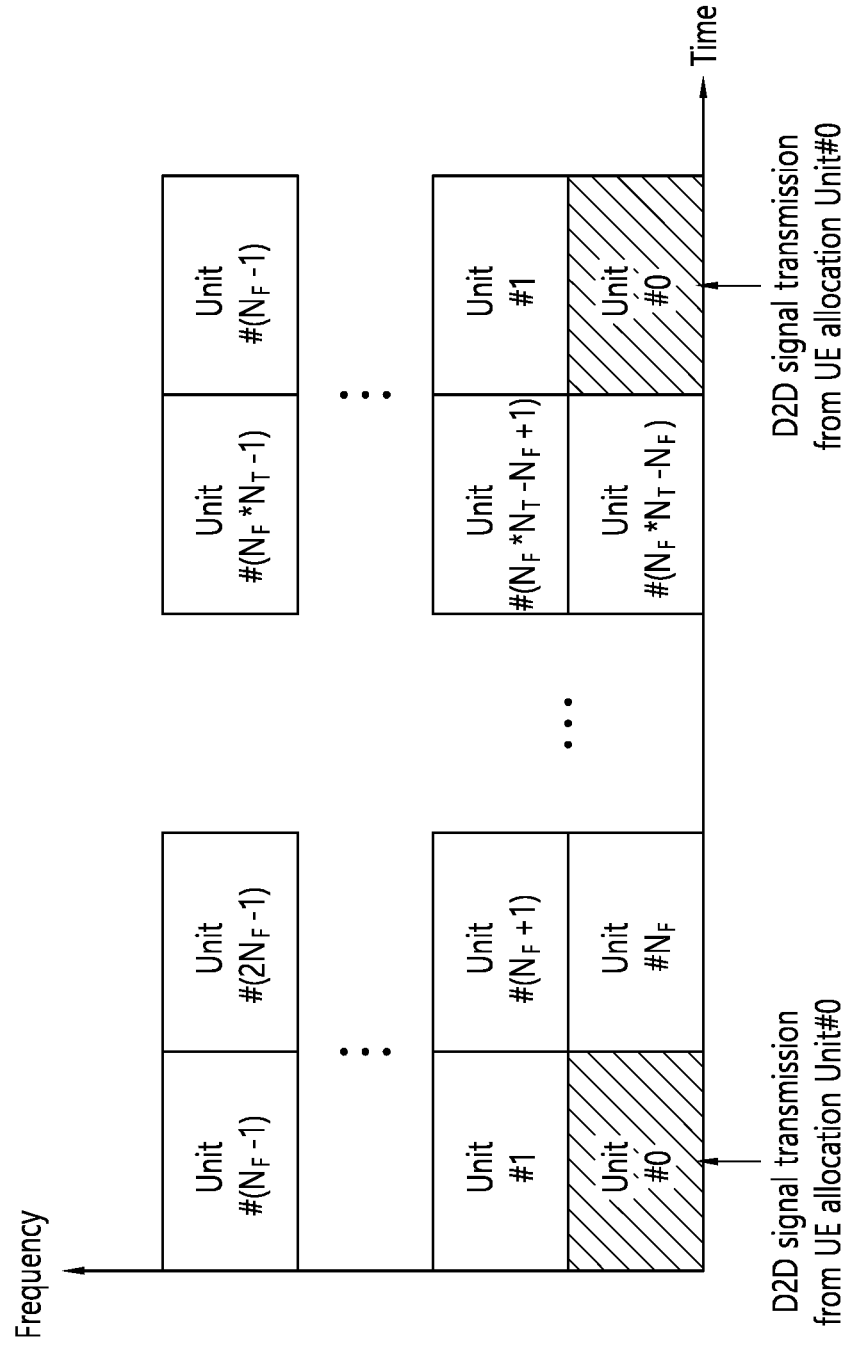
FIG. 12 shows an exemplary configuration of a resource unit to which an exemplary embodiment of the present disclosure can be applied.

FIG. 12 shows an exemplary configuration of a resource unit to which an exemplary embodiment of the present disclosure can be applied.

Referring to FIG. 12, the total frequency resources of the resource pool may be divided into NF number of resource units, the total time resources of the resource pool may be divided into NT number of resource units. Therefore, a total of $N_F*N_T$ number of resource units may be defined in the resource pool. FIG. 12 shows an example of a case where the corresponding resource pool is repeated at a cycle of NT number of subframes.

As shown in FIG. 12, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a predetermined pattern in accordance with time. In such resource unit structure, the resource pool may refer to a set of resource units that can be used for a transmission that is performed by a user equipment (UE), which intends to transmit sidelink signals.

The resource pool may be segmented to multiple types. For example, depending upon the content of a sidelink signal being transmitted from each resource pool, the resource pool may be divided as described below.

(1) Scheduling Assignment (SA) may be a signal including information, such as a position of a resource that is used for the transmission of a sidelink data channel, a Modulation and Coding Scheme (MCS) or MIMO transmission scheme needed for the modulation of other data channels, a Timing Advance (TA), and so on. The SA may also be multiplexed with sidelink data within the same resource unit and may then be transmitted, and, in this case, an SA resource pool may refer to a resource pool in which the SA is multiplexed with the sidelink data and then transmitted. The SA may also be referred to as a sidelink control channel.

(2) A Physical Sidelink Shared Channel (PSSCH) may be a resource pool that is used by a transmitting UE for transmitting user data. If the SA is multiplexed with sidelink data within the same resource unit and then transmitted, only a sidelink data channel excluding the SA information may be transmitted from the resource pool that is configured for the sidelink data channel. In other words, REs that were used for transmitting SA information within a separate resource unit of the SA resource pool may still be used for transmitting sidelink data from the resource pool of a sidelink data channel.

(3) A discovery channel may be a resource pool that is used by the transmitting UE for transmitting information, such as its own ID. By doing so, the transmitting UE may allow a neighboring UE to discover the transmitting UE.

Even if the content of the above-described sidelink signal is the same, different resource pools may be used depending upon the transmission/reception attribute of the sidelink signal. For example, even if the same sidelink data channel or discovery message is used, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the base station designates a transmission resource of a separate signal to a separate transmitting UE or whether a separate transmitting UE selects a separate signal transmission resource on its own from the resource pool), and a signal format (e.g., a number of symbols occupied by each sidelink signal within a subframe or a number of subframes being used for the transmission of one sidelink signal) of the sidelink signal, signal intensity from the base station, a transmitting power intensity (or level) of a sidelink UE, and so on.

Hereinafter, resource allocation in a sidelink will be described in detail.

Figure 13:
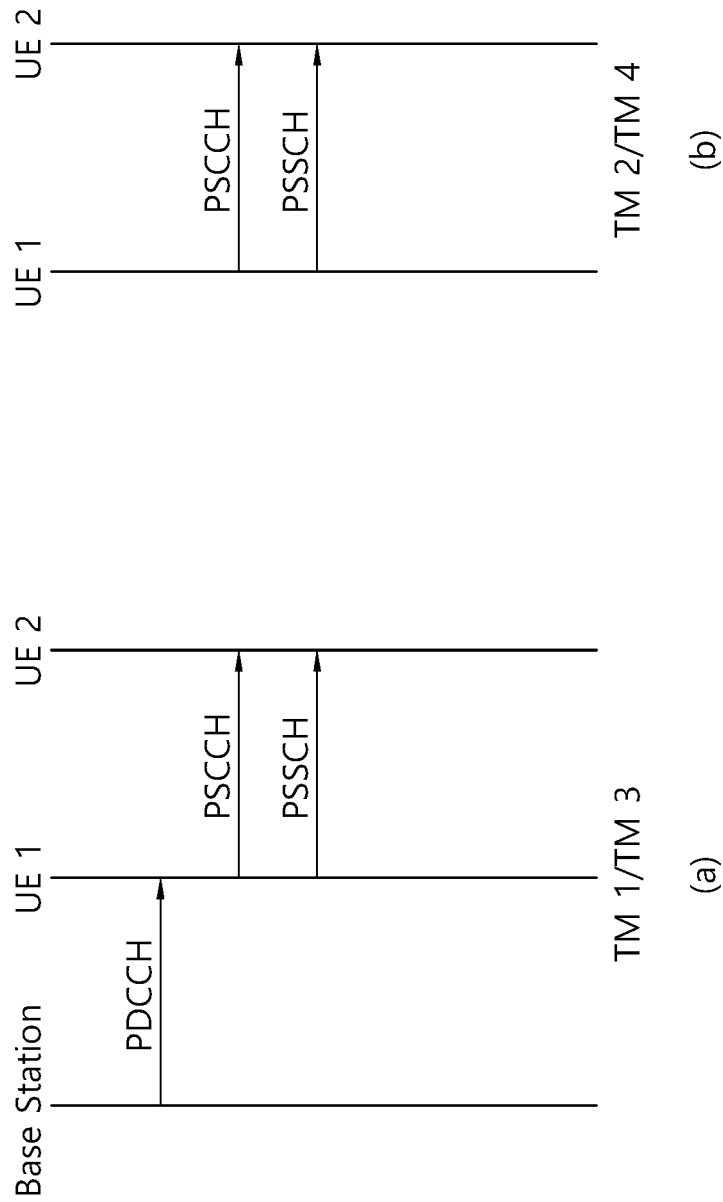
FIG. 13 shows user equipment (UE) operations according to a transmission mode (TM) being related to sidelink/V2X communication to which an exemplary embodiment of the present disclosure can be applied.

FIG. 13 shows user equipment (UE) operations according to a transmission mode (TM) being related to sidelink/V2X communication to which an exemplary embodiment of the present disclosure can be applied.

(a) of FIG. 13 represents UE operations being related to transmission mode 1 or transmission mode 3, and (b) of FIG. 13 represents UE operations being related to transmission mode 2 or transmission mode 4.

Referring to (a) of FIG. 13, in transmission modes 1/3, the base station performs resource scheduling to UE1 via PDCCH (more specifically, DCI), and UE1 performs sidelink/V2X communication with UE2 according to the corresponding resource scheduling. After transmitting sidelink control information (SCI) to UE2 via physical sidelink control channel (PSCCH), UE1 may transmit data based on the SCI via physical sidelink shared channel (PSSCH). In case of an LTE sidelink, transmission mode 1 may be applied to a general sidelink communication, and transmission mode 3 may be applied to a V2X sidelink communication.

Referring to (b) of FIG. 13, in transmission modes 2/4, the UE may schedule resources on its own. More specifically, in case of LTE sidelink, transmission mode 2 may be applied to a general sidelink communication, and the UE may select a resource from a predetermined resource pool on its own and may then perform sidelink operations. Transmission mode 4 may be applied to a V2X sidelink communication, and the UE may carry out a sensing/SA decoding procedure, and so on, and select a resource within a selection window on its own and may then perform V2X sidelink operations. After transmitting the SCI to UE2 via PSCCH, UE1 may transmit SCI-based data via PSSCH. Hereinafter, the transmission mode may be abbreviated to mode.

In case of NR sidelink, at least two types of sidelink resource allocation modes may be defined. In case of mode 1, the base station may schedule sidelink resources that are to be used for sidelink transmission. In case of mode 2, the user equipment (UE) may determine a sidelink transmission resource from sidelink resources that are configured by the base station/network or predetermined sidelink resources.

The configured sidelink resources or the predetermined sidelink resources may be a resource pool. For example, in case of mode 2, the UE may autonomously select a sidelink resource for transmission. For example, in case of mode 2, the UE may assist (or help) sidelink resource selection of another UE. For example, in case of mode 2, the UE may be configured with an NR configured grant for sidelink transmission. For example, in case of mode 2, the UE may schedule sidelink transmission of another UE. And, mode 2 may at least support reservation of sidelink resources for blind retransmission.

Procedures related to sensing and resource (re)selection may be supported in resource allocation mode 2. The sensing procedure may be defined as a process decoding the SCI from another UE and/or sidelink measurement. The decoding of the SCI in the sensing procedure may at least provide information on a sidelink resource that is being indicated by a UE transmitting the SCI. When the corresponding SCI is decoded, the sensing procedure may use L1 SL RSRP measurement, which is based on SL DMRS. The resource (re)selection procedure may use a result of the sensing procedure in order to determine the resource for the sidelink transmission.

Figure 14:
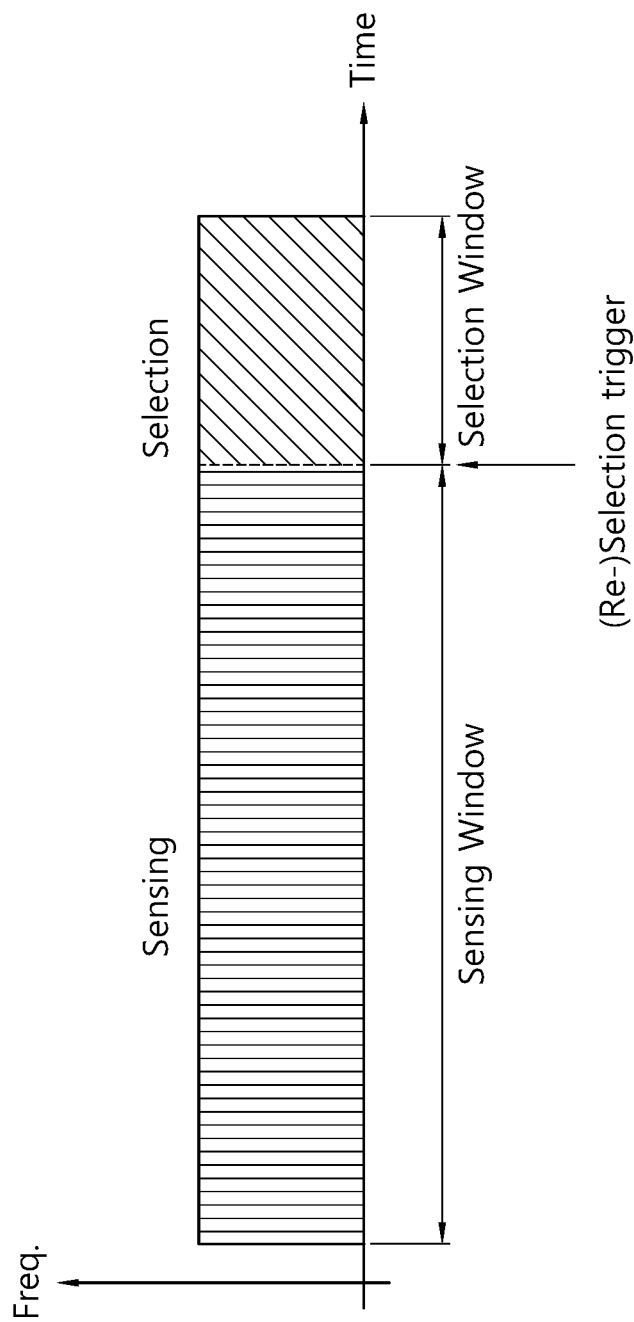
FIG. 14 shows an example where a transmission resource to which an exemplary embodiment of the present disclosure can be applied.

FIG. 14 shows an example where a transmission resource to which an exemplary embodiment of the present disclosure can be applied.

Referring to FIG. 14, the UE may identify transmission resources reserved by another UE or resources being used by another UE via sensing within a sensing window, and, after excluding the identified resources from a selection window, the UE may randomly select a resource from resources having low interference among the remaining resources.

For example, within the sensing window, the UE may decode the PSCCH including information on the cycles of the reserved resources, and, then, the UE may measure a PSSCH RSRP from resources that are periodically determined based on the PSCCH. The UE may exclude resources having the PSSCH RSRP that exceed a threshold value from the selection window. Thereafter, the UE may randomly select a sidelink resource from the remaining resources within the selection window.

Alternatively, the UE may measure a Received signal strength indication (RSSI) of the periodic resources within the sensing window and may then determine the resources having low interference (e.g., the lower 20% of the resources). Additionally, the UE may also randomly select a sidelink resource from the resources included in the selection window among the periodic resources. For example, in case the UE fails to perform decoding of the PSCCH, the UE may use the above-described methods.

Hereinafter, synchronization acquisition of an SL UE will be described.

In time division multiple access (TDMA) and frequency division multiple access (FDMA) systems, accurate time and frequency synchronization is essential. If the time and frequency synchronization is not accurate, system performance may be degraded due to inter symbol interference (ISI) and inter carrier interference (ICI). The same is true for V2X. In V2X, for time/frequency synchronization, sidelink synchronization signal (SLSS) may be used in a physical layer, and master information block-sidelink-V2X (MIB-SL-V2X) may be used in a radio link control (RLC) layer.

Figure 15:
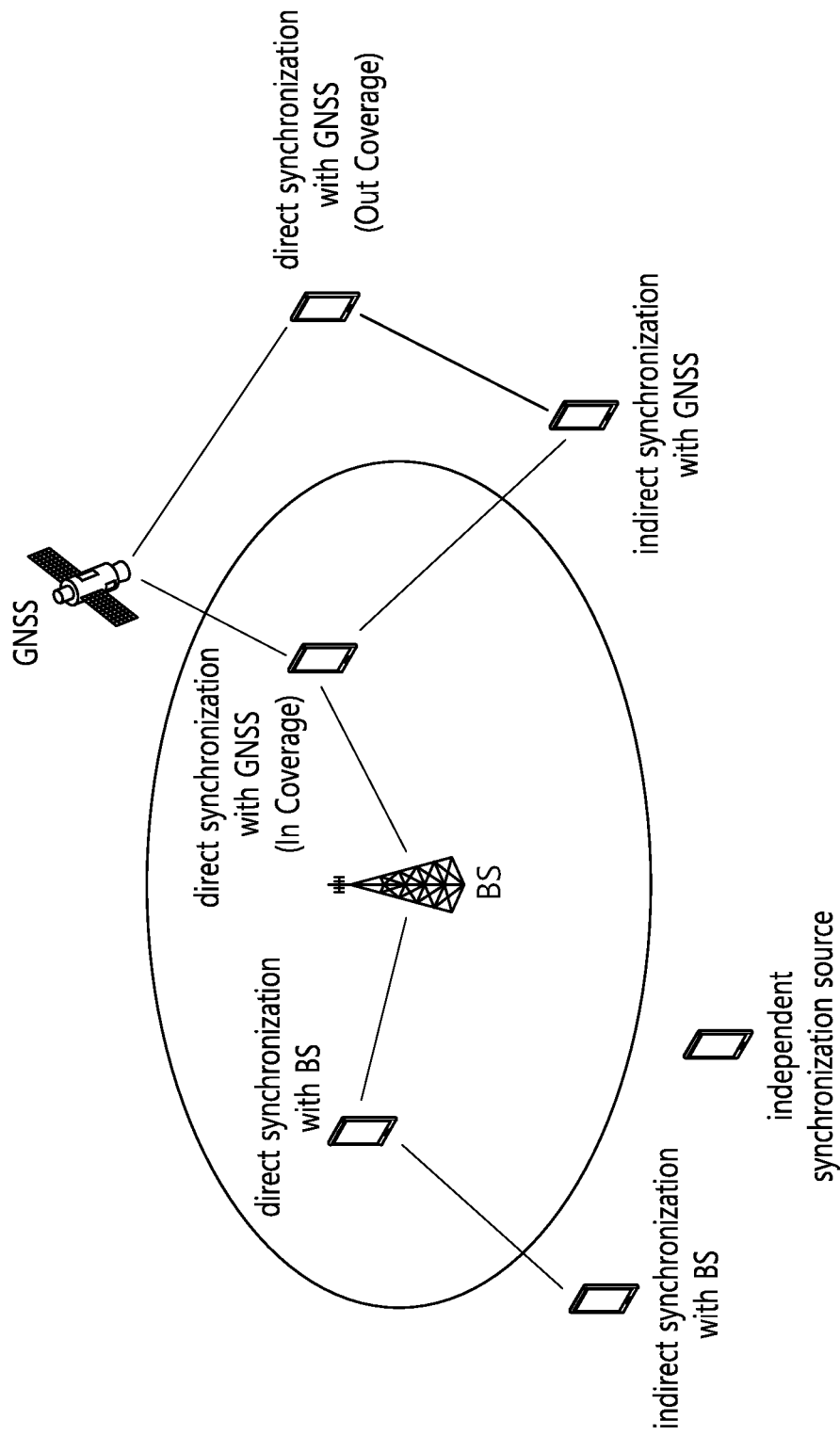
FIG. 15 shows a synchronization source or synchronization reference of V2X to which an exemplary embodiment of the present disclosure can be applied.

FIG. 15 shows a synchronization source or synchronization reference of V2X to which an exemplary embodiment of the present disclosure can be applied.

Referring to FIG. 15, in V2X, a UE may be directly synchronized with a global navigation satellite system (GNSS), or may be indirectly synchronized with the GNSS through a UE (inside network coverage or outside network coverage) directly synchronized with the GNSS. If the GNSS is configured as the synchronization source, the UE may calculate a DFN and a subframe number by using a coordinated universal time (UTC) and a (pre)configured direct frame number (DFN) offset.

Alternatively, the UE may be directly synchronized with a BS, or may be synchronized with another UE which is time/frequency-synchronized with the BS. For example, the BS may be an eNB or a gNB. For example, if the UE is inside the network coverage, the UE may receive synchronization information provided by the BS, and may be directly synchronized with the BS. Thereafter, the UE may provide the synchronization information to adjacent another UE. If BS timing is configured based on synchronization, for synchronization and downlink measurement, the UE may be dependent on a cell related to a corresponding frequency (when it is inside the cell coverage at the frequency), or a primary cell or a serving cell (when it is outside the cell coverage at the frequency).

The BS (e.g., serving cell) may provide a synchronization configuration for a carrier used in V2X or SL communication. In this case, the UE may conform to the synchronization configuration received from the BS. If the UE fails to detect any cell in a carrier used in the V2X or SL communication and fails to receive the synchronization configuration from the serving cell, the UE may conform to a preconfigured synchronization configuration.

Alternatively, the UE may be synchronized with another UE which fails to obtain synchronization information directly or indirectly from the BS or the GNSS. A synchronization source or preference may be preconfigured to the UE. Alternatively, the synchronization source and preference may be configured through a control message provided by the BS.

An SL synchronization source may be related to a synchronization priority. For example, a relation between the synchronization source and the synchronization priority may be defined as shown in Table 3. Table 3 is for exemplary purposes only, and the relation between the synchronization source and the synchronization priority may be defined in various forms.

TABLE 3

| Priority level | GNSS-based synchronization | eNB/gNB-based synchronization |
| --- | --- | --- |
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

Whether to use GNSS-based synchronization or BS-based synchronization may be (pre)configured. In a single-carrier operation, the UE may derive transmission timing of the UE from an available synchronization reference having the highest priority.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present specification, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present specification, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 16:
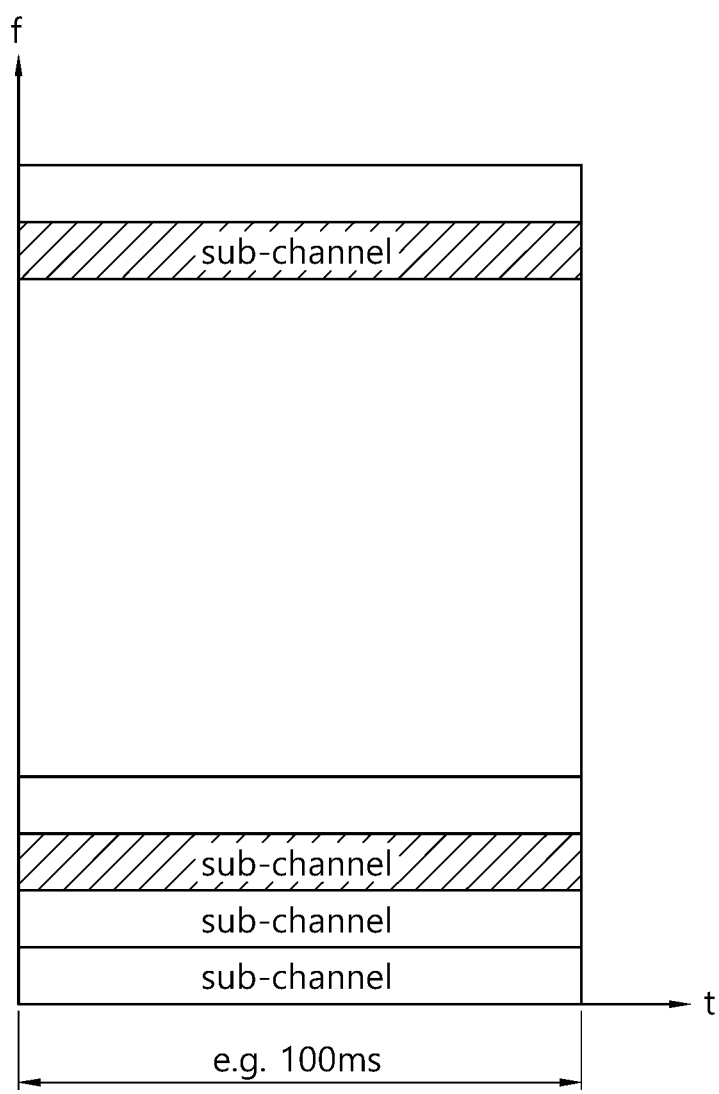
FIG. 16 shows a CBR to which an exemplary embodiment of the present disclosure can be applied.

FIG. 16 shows a CBR to which an exemplary embodiment of the present disclosure can be applied.

Referring to FIG. 16, CBR may denote the number of subchannels in which a measurement result value of a received signal strength indicator (RSSI) has a value greater than or equal to a preconfigured threshold as a result of measuring the RSSI by a UE on a subchannel basis for a specific period (e.g., 100 ms). Alternatively, the CBR may denote a ratio of subchannels having a value greater than or equal to a preconfigured threshold among subchannels for a specific duration. For example, in the embodiment of FIG. 16, if it is assumed that a hatched subchannel is a subchannel having a value greater than or equal to a preconfigured threshold, the CBR may denote a ratio of the hatched subchannels for a period of 100 ms.

Further, congestion control considering a priority of traffic (e.g., packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

Meanwhile, in case the UE performs SL communication based on heterogeneous RAT (e.g., NR and LTE) on different channels, an efficient coexistence method considering transmission power distribution, synchronization, time synchronization, half-duplex problem (or issue), service priority, and/or service type, and so on, may be needed. Additionally, in case the UE performs SL communication based on heterogeneous RAT (e.g., NR and LTE) on a same channel, an efficient coexistence method considering transmission power distribution, synchronization, time synchronization, half-duplex problem (or issue), service priority, and/or service type, and so on, may be needed. For example, the coexistence may be an in-device coexistence. For example, the different channels may be continuous different channels within an intra-band. For example, the different channels may be non-continuous different channels within an intra-band. For example, the different channels may be different channels on an inter-band.

Hereinafter, according to the embodiment of the present disclosure, in case the UE performs SL communication based on heterogeneous RAT, on different channels or a same channel, a method for efficiently coexisting heterogeneous RAT and a device (or apparatus) supporting the same will be described.

In this specification, for convenience in the description, LTE-related sidelink transmission or LTE-based sidelink transmission may be referred to as LTE SL transmission, and NR-related sidelink transmission or NR-based sidelink transmission may be referred to as NR SL transmission.

In the present specification, sidelink RSSI (S-RSSI) may be defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe. In the present specification, PSSCH Reference Signal Received Power (PSSCH-RSRP) may be defined as the linear average over the power contributions (in [W]) of the resource elements that carry demodulation reference signals associated with PSSCH, within the PRBs indicated by the associated PSCCH).

In the present specification, a receiving operation of the UE may include a decoding operation and/or receiving operation of a sidelink channel and/or sidelink signal (e.g., PSCCH, PSSCH, PSFCH, PSBCH, PSSS/SSSS, etc.). The receiving operation of the UE may include a decoding operation and/or receiving operation of a WAN DL channel and/or WAN DL signal (e.g., PDCCH, PDSCH, PSS/SSS, etc.). The receiving operation of the UE may include a sensing operation and/or a CBR measuring operation. In the present specification, the sensing operation of the UE may include a PSSCH-RSRP measuring operation based on a PSSCH DM-RS sequence, a PSSCH-RSRP measuring operation based on a PSSCH DM-RS sequence scheduled by a PSCCH successfully decoded by the UE, a sidelink RSSI (S-RSSI) measuring operation, and/or an S-RSSI measuring operation based on a sub-channel related to a V2X resource pool. In the present specification, a transmitting operation of the UE may include a transmitting operation of a sidelink channel and/or a sidelink signal (e.g., PSCCH, PSSCH, PSFCH, PSBCH, PSSS/SSSS, etc.). The transmitting operation of the UE may include a transmitting operation of a WAN UL channel and/or a WAN UL signal (e.g., PUSCH, PUCCH, SRS, etc.). In the present specification, a synchronization signal may include an SLSS and/or a PSBCH.

In the present specification, a configuration may include signaling, signaling from a network, a configuration from the network, and/or a pre-configuration from the network. In the present specification, a definition may include signaling, signaling from a network, a configuration form the network, and/or a pre-configuration from the network. In the present specification, a designation may include signaling, signaling from a network, a configuration from the network, and/or a pre-configuration from the network. In the present specification, a ProSe per packet priority (PPPP) may be replaced with a ProSe per packet reliability (PPPR), and the PPPR may be replaced with the PPPP. In the present specification, it may mean that the smaller the PPPP value, the higher the priority, and that the greater the PPPP value, the lower the priority. In the present specification, it may mean that the smaller the PPPR value, the higher the reliability, and that the greater the PPPR value, the lower the reliability. For example, a PPPP value related to a service, packet or message related to high priority may be smaller than a PPPP value related to a service, packet or message related to low priority. For example, a PPPP value related to a service, packet or message related to high reliability may be smaller than a PPPP value related to a service, packet or message related to low reliability.

In this specification, a channel may be mutually and extendedly interpreted as at least one of a carrier, a BWP, and/or a resource pool. For example, a channel may include at least one of a carrier, a BWP, and/or a resource pool. For example, a carrier may include at least one of a channel, a BWP, and/or a resource pool. For example, a carrier may include one or more BWPs. For example, a BWP may include one or more resource pools.

For example, within a BWP or active BWP, multiple beam search resources or beam measurement resources may be configured in an FDM format. For example, this may be performed for reducing the time required for beam search or beam measurement. For example, between different beams, an SL synchronization signal and transmission resource related to PSBCH may be partly or fully configured in a TDM format. For example, this may be performed for avoiding a power limited case.

Some or all of the methods proposed in the present specification may be limited to a transmitting operation of the UE, a transmission carrier selecting operation, and/or a transmission BWP selecting operation. Alternatively, for example, some or all of the methods proposed in the present specification may be limited to a receiving operation of the UE, a reception carrier selecting operation, and/or a reception BWP selecting operation.

At least one method proposed in the present specification may apply not only to sidelink communication or V2X communication based on a PC5 interface or an SL interface (e.g., PSCCH, PSSCH, PSBCH, PSSS/SSSS, etc.) but also to sidelink communication or V2X communication based on a Uu interface (e.g., PUSCH, PDSCH, PDCCH, PUCCH, etc.).

At least one proposed method that is proposed in this specification may be limitedly applied only in a case where LTE SL transmission and NR SL transmission are performed through different (continuous or non-continuous) channels within an intra-band. Alternatively, at least one proposed method that is proposed in this specification may be limitedly applied only in a case where LTE SL transmission and NR SL transmission are performed through different channels on an inter-band.

According to an embodiment of the present disclosure, in case NR SL transmission and LTE SL transmission performed on different channels partly or fully overlap within a time domain, and in case a sum of transmission power being required for NR SL transmission and LTE SL transmission exceeds a maximum transmission power (hereinafter, P_MAX) of the UE, and/or in case NR SL transmission and LTE SL transmission partly or fully overlapping within a time domain exceed (RF) capability (e.g., number of equipped TX chains, and so on), according to part or all of the following rules, the UE may distribute P_MAX. For example, P_MAX may be distributed between NR SL transmission and LTE SL transmission.

Alternatively, according to part or all of the following rules, until P_MAX is no longer exceeded, the UE may decrease transmission power related to transmission of a relatively low priority. Alternatively, according to part or all of the following rules, the UE may omit transmission of a relatively low priority. For example, in case NR SL transmission and LTE SL transmission on different channels partly or fully overlap within a time domain, the UE may omit transmission of a relatively low priority. Herein, for example, an operation of decreasing transmission power, an operation of distributing transmission power and/or an operation of omitting transmission may be applied fully (for all symbols) and not for part of the symbols of an SL transmission signal and/or channel. The rules that will hereinafter be described may be mutually combined.

1) Rule 1

For example, LTE SL transmission may be configured at a relatively high priority. Alternatively, for example, NR SL transmission may be configured at a relatively high priority. Alternatively, for example, a power distribution ratio between LTE SL transmission and NR SL transmission may be preconfigured for the UE.

2) Rule 2

For example, transmission of a message related to a relatively small PPPP value may be configured at a relatively high priority. Alternatively, for example, transmission of a message related to a relatively large PPPP value may be configured at a relatively high priority. Alternatively, for example, transmission of a message related to a relatively small PPPR value may be configured at a relatively high priority. Alternatively, for example, transmission of a message related to a relatively large PPPR value may be configured at a relatively high priority. Alternatively, for example, transmission of a message related to a service (type) having a relatively high priority may be configured at a relatively high priority. For example, a message related to public safety may be configured at a priority that is higher than a commercial message or a message related to non-public safety. For example, a unicast message may be configured at a priority that is higher than a broadcast message or groupcast message. Alternatively, for example, transmission of a message related to a service (type) having a relatively low priority may be configured at a relatively high priority. For example, a message related to public safety may be configured at a priority that is lower than a commercial message or a message related to non-public safety. For example, a unicast message may be configured at a priority that is lower than a broadcast message or groupcast message. Alternatively, for example, transmission of a generation type message having a relatively high priority may be configured at a relatively high priority. Alternatively, for example, transmission of a generation type message having a relatively low priority may be configured at a relatively high priority. For example, an aperiodic message (e.g., an aperiodically generated message) may be configured at a priority that is higher than a periodic message (e.g., a periodically generated message). For example, an aperiodic message may be configured at a priority that is lower than a periodic message. Alternatively, for example, transmission of a message having a relatively short latency requirement may be configured at a relatively high priority. Alternatively, for example, transmission of a message having a relatively long latency requirement may be configured at a relatively high priority. Alternatively, for example, transmission of a message having a high reliability requirement may be configured at a relatively high priority. Alternatively, for example, transmission of a message having a low reliability requirement may be configured at a relatively high priority.

3) Rule 3

For example, transmission of a message having a relatively high required power may be configured at a relatively high priority. Alternatively, for example, transmission of a message having a relatively low required power may be configured at a relatively high priority. Alternatively, for example, transmission of a randomly selected message may be configured at a relatively high priority. Alternatively, for example, transmission of a message on a primary channel may be configured at a relatively high priority. Alternatively, for example, transmission of a message on a secondary channel may be configured at a relatively high priority. Alternatively, for example, transmission of a message on a channel belonging to a master cell group (MCG) may be configured at a relatively high priority. Alternatively, for example, transmission of a message on a channel belonging to a secondary cell group (SCG) may be configured at a relatively high priority. Alternatively, for example, transmission of a message on a channel having a relatively small CBR value may be configured at a relatively high priority. Alternatively, for example, transmission of a message on a channel having a relatively large CBR value may be configured at a relatively high priority. Alternatively, for example, transmission of a message on a channel having a relatively small CR value may be configured at a relatively high priority. Alternatively, for example, transmission of a message on a channel having a relatively large CR value may be configured at a relatively high priority. Alternatively, for example, transmission of a message on a channel having a large remaining CR value against CR LIMIT may be configured at a relatively high priority. Alternatively, for example, transmission of a message on a channel having a small remaining CR value against CR LIMIT may be configured at a relatively high priority. Alternatively, for example, transmission of a message that is based on a resource being reserved at a relatively long cycle may be configured at a relatively high priority. Alternatively, for example, transmission of a message that is based on a resource being reserved at a relatively short cycle may be configured at a relatively high priority. Alternatively, for example, transmission of a message that is based on a resource being configured of a relatively small number of symbols may be configured at a relatively high priority. Alternatively, for example, transmission of a message that is based on a resource being configured of a relatively large number of symbols may be configured at a relatively high priority. Alternatively, for example, transmission of a message on a channel having a relatively small subcarrier spacing value configured thereto may be configured at a relatively high priority. Alternatively, for example, transmission of a message on a channel having a relatively large subcarrier spacing value configured thereto may be configured at a relatively high priority. Alternatively, for example, transmission of a message on a channel having a relatively long CP length configured thereto may be configured at a relatively high priority. Alternatively, for example, transmission of a message on a channel having a relatively short CP length configured thereto may be configured at a relatively high priority. Alternatively, for example, transmission of a message on a channel having a relatively low index may be configured at a relatively high priority. Alternatively, for example, transmission of a message on a channel having a relatively high index may be configured at a relatively high priority. Alternatively, for example, transmission of a pre-configured signal, channel and/or information (e.g., PSSS/SSSS, PSBCH, HARQ-ACK feedback, (channel state information and/or link quality) measurement reporting) may be configured at a relatively high priority. Alternatively, for example, transmission of a signal, channel and/or information being preconfigured at a relatively high priority may be configured at a relatively high priority. Alternatively, for example, transmission of a signal, channel and/or information being preconfigured at a relatively low priority may be configured at a relatively high priority. Alternatively, for example, transmission of a message that is based on Resource Allocation Mode 1 may be configured at a relatively high priority. Alternatively, for example, transmission of a message that is based on Resource Allocation Mode 2 may be configured at a relatively high priority.

For example, according to Rule 2, in case LTE SL transmission and NR SL transmission have a same priority, based on Rule 3, the UE may determine a transmission from which power is to be reduced or a transmission that is to be omitted until P_MAX is no longer exceeded. For example, according to Rule 2, in case LTE SL transmission and NR SL transmission are related to a same PPPP value or a same PPPR value, based on Rule 3, the UE may determine a transmission from which power is to be reduced or a transmission that is to be omitted until P_MAX is no longer exceeded. For example, according to Rule 2, in case LTE SL transmission and NR SL transmission are related to a same latency requirement or a same reliability requirement, based on Rule 3, the UE may determine a transmission from which power is to be reduced or a transmission that is to be omitted until P_MAX is no longer exceeded.

For example, at least one of S-SSB (e.g., PSSS, SSSS, and PBCH) transmission, SL HAQR-ACK feedback transmission, SL channel state information (CSI) transmission, (L1) SL RSRP transmission, SL RSSI transmission, and/or SL CSI-RS transmission may be assumed to have a preconfigured priority. Alternatively, for example, at least one of S-SSB transmission, SL HAQR-ACK feedback transmission, SL CSI transmission, (L1) SL RSRP transmission, SL RSSI transmission, and/or SL CSI-RS transmission may be assumed to have a priority that is related to an interlinked service/packet and/or PSCCH/PSSCH. For example, at least one of S-SSB transmission, SL HAQR-ACK feedback transmission, SL CSI transmission, (L1) SL RSRP transmission, SL RSSI transmission, and/or SL CSI-RS transmission may be assumed to have a highest priority that is related to an interlinked service/packet and/or PSCCH/PSSCH. For example, at least one of S-SSB transmission, SL HAQR-ACK feedback transmission, SL CSI transmission, (L1) SL RSRP transmission, SL RSSI transmission, and/or SL CSI-RS transmission may be assumed to have a lowest priority that is related to an interlinked service/packet and/or PSCCH/PSSCH.

According to the embodiment of the present disclosure, a maximum allowed transmission power value that is to be used for the LTE SL transmission and NR_SL transmission may be configured or preconfigured for the UE. In this specification, for convenience in the description, a maximum allowed transmission power value that is to be used for the LTE SL transmission may be referred to as MAX_PLT, and a maximum allowed transmission power value that is to be used for the NR SL transmission may be referred to as MAX_PNR. For example, MAX_PLT may be configured for a channel and/or carrier being related to LTE SL transmission, and MAX_PNR may be configured for a channel and/or carrier being related to NR SL transmission. For example, a channel and/or carrier through which the LTE SL transmission is performed may be different from a channel and/or carrier through which the NR SL transmission is performed. For example, in case such rules are applied, if a required power of the LTE SL transmission exceeds MAX_PLT, the (required) power of the LTE SL transmission may be reconfigured to MAX_PLT. Alternatively, for example, in case such rules are applied, if a required power of the NR SL transmission exceeds MAX_PNR, the (required) power of the NR_SL transmission may be reconfigured to MAX_PNR.

According to the embodiment of the present disclosure, a minimum ensured transmission power value that is to be used for the LTE SL transmission and NR_SL transmission may be configured or preconfigured for the UE. In this specification, for convenience in the description, a minimum ensured transmission power value that is to be used for the LTE SL transmission may be referred to as MIN_PLT, and a minimum ensured transmission power value that is to be used for the NR SL transmission may be referred to as MIN_PNR. For example, MIN_PLT may be configured for a channel and/or carrier being related to LTE SL transmission, and MIN_PNR may be configured for a channel and/or carrier being related to NR SL transmission. For example, a channel and/or carrier through which the LTE SL transmission is performed may be different from a channel and/or carrier through which the NR SL transmission is performed. Herein, for example, based on Rule 2, even if the UE reduces the (required) power of the LTE SL transmission, the (required) power of the LTE SL transmission cannot be smaller than MIN_PLT. Alternatively, for example, based on Rule 2, even if the UE reduces the (required) power of the NR SL transmission, the (required) power of the NR_SL transmission cannot be smaller than MIN_PNR.

According to the embodiment of the present disclosure, the UE may align time synchronization between the LTE SL transmission/communication and the NR SL transmission/communication. For example, the UE may align time and/or frequency synchronization between the LTE SL transmission/communication and the NR SL transmission/communication. For example, for the LTE SL transmission/communication and the NR SL transmission/communication (on different channels), the UE may derive time and/or frequency synchronization from a preconfigured (common) synchronization reference source. For example, the UE may derive time and/or frequency synchronization for the LTE SL transmission/communication and the NR SL transmission/communication (on different channels) from a synchronization related to LTE SL transmission/communication. For example, NR SL may align its synchronization with LTE SL. Alternatively, for example, the UE may derive time and/or frequency synchronization for the LTE SL transmission/communication and the NR SL transmission/communication (on different channels) from a synchronization related to NR SL transmission/communication.

Figure 17:
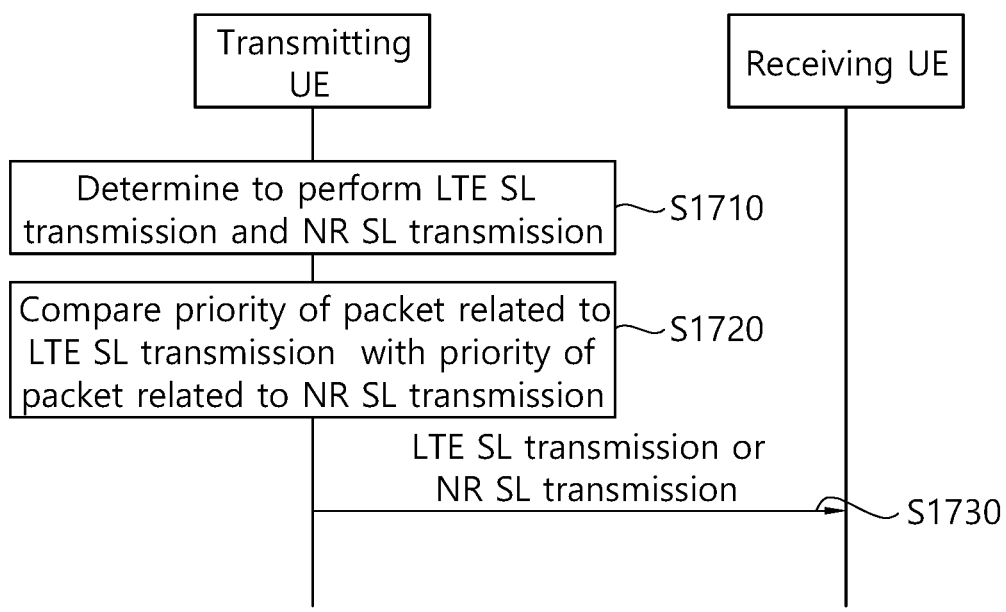
FIG. 17 shows a method for performing sidelink transmission, by a UE, based on a priority of sidelink transmission, according to an embodiment of the present disclosure.

FIG. 17 shows a method for performing sidelink transmission, by a UE, based on a priority of sidelink transmission, according to an embodiment of the present disclosure.

Referring to FIG. 17, in step S1710, the UE may determine to perform LTE SL transmission and NR SL transmission. For example, the UE may include a modem related to LTE SL transmission and a modem related to NR SL transmission. For example, LTE SL transmission and NR SL transmission may overlap. For example, LTE SL transmission and NR SL transmission may partly or fully overlap within the time domain.

In step S1720, the UE may compare a priority of the LTE SL transmission with a priority of the NR SL transmission. For example, the UE may compare a priority of a packet related to the LTE SL transmission with a priority of a packet related to the NR SL transmission. For example, the UE may compare a priority of a service related to the LTE SL transmission with a priority of a service related to the NR SL transmission. In order to compare the priorities, the priority of the LTE SL transmission and the priority of the NR SL transmission may be exchanged between a modem related to LTE SL transmission and a modem related to NR SL transmission.

In step S1730, between the LTE SL transmission and the NR SL transmission, the UE may perform SL transmission that is related to a high priority. Conversely, the UE may omit SL transmission that is related to a low priority.

For example, Table 4 shows an example of priorities related to the LTE SL transmission and priorities related to the NR SL transmission. For convenience in the description, although the description will be based on PPPP, the priorities will not be limited only to PPPP. For example, the priorities may be defined by various methods. For example, a same type of common priorities may be applied to an NR-related service and an LTE-related service.

TABLE 4

| LTE related service | PPPP value | NR related service | PPPP value |
|---|---|---|---|
| LTE SL Service A | 1 | NR SL Service D | 1 |
| LTE SL Service B | 2 | NR SL Service E | 2 |
| LTE SL Service C | 3 | NR SL Service F | 3 |

For example, in the embodiment of Table 4, the UE determines to transmit LTE SL Service A and NR SL Service E, and it is assumed that transmission of LTE SL Service A overlaps with transmission of NR SL Service E. For example, transmission of LTE SL Service A may partly or fully overlap with transmission of NR SL Service E within the time domain. In this case, the UE may only perform SL transmission that is related to a high priority, and the UE may omit SL transmission that is related to a low priority. For example, the UE may transmit only LTE SL Service A on a first carrier and/or a first channel. Conversely, the UE may not transmit NR SL Service E on a second carrier and/or a second channel.

For example, in the embodiment of Table 4, the UE determines to transmit LTE SL Service C and NR SL Service E, and it is assumed that transmission of LTE SL Service C overlaps with transmission of NR SL Service E. For example, transmission of LTE SL Service C may partly or fully overlap with transmission of NR SL Service E within the time domain. In this case, the UE may only perform SL transmission that is related to a high priority, and the UE may omit SL transmission that is related to a low priority. For example, the UE may transmit only NR SL Service E on a second carrier and/or a second channel. Conversely, the UE may not transmit LTE SL Service C on a first carrier and/or a first channel.

For example, in the embodiment of Table 4, the UE determines to transmit LTE SL Service C and NR SL Service F, and it is assumed that transmission of LTE SL Service C overlaps with transmission of NR SL Service F. For example, transmission of LTE SL Service C may partly or fully overlap with transmission of NR SL Service F within the time domain. In this case, since the priority related to the LTE SL transmission and the priority related to the NR SL transmission are the same, the UE may transmit one of LTE SL Service C and NR SL Service F by applying at least one of Rule 1 to Rule 3.

Figure 18:
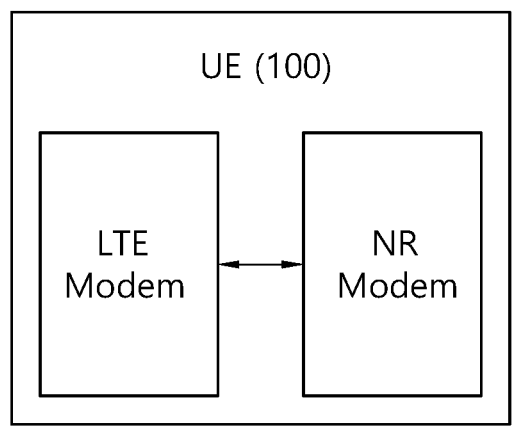
FIG. 18 shows an example of a UE (100), according to an embodiment of the present disclosure.

FIG. 18 shows an example of a UE (100), according to an embodiment of the present disclosure.

Referring to FIG. 18, the UE may include a modem related to LTE SL transmission and a modem related to NR SL transmission. A packet related to LTE SL transmission that is generated from a high layer may be delivered to an LTE modem. And, a packet related to NR SL transmission that is generated from a high layer may be delivered to an NR modem. Herein, for example, an LTE modem and an NR modem may be related to a common high layer (e.g., application layer). Alternatively, for example, an LTE modem and an NR modem may be related to different high layers (e.g., a high layer related to an LTE modem and a high layer related to an NR modem). Each packet may be related to a specific priority. In this case, the LTE modem may not know the priority of the packet related to NR SL transmission, and the NR modem may not know the priority of the packet related to LTE SL transmission. In order to compare the priorities, the priority of the packet related to the LTE SL transmission and the priority of the packet related to the NR SL transmission may be exchanged between the LTE modem and the NR modem. Therefore, the LTE modem and the NR modem may know the priority of the packet related to the LTE SL transmission and the priority of the packet related to the NR SL transmission. And, in case the LTE SL transmission and the NR SL transmission overlap, the UE may compare the priority of the packet related to the LTE SL transmission with the priority of the packet related to the NR SL transmission, and, then, the UE may perform only the SL transmission related to the high priority.

According to the embodiment of the present disclosure, the synchronization related to NR SL communication may be aligned with the synchronization related to LTE SL communication.

Figure 19:
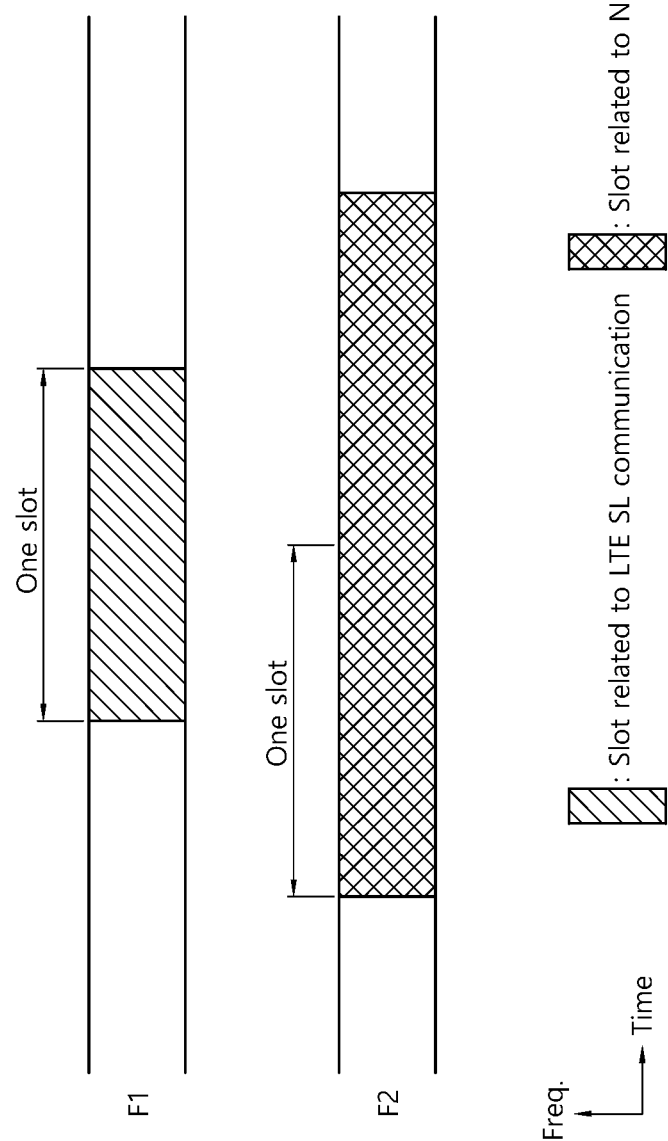
FIG. 19 is a diagram for describing a problem that may occur when synchronization of NR SL transmission and LTE SL transmission do not align.

FIG. 19 is a diagram for describing a problem that may occur when synchronization of NR SL transmission and LTE SL transmission do not align.

Referring to FIG. 19, it is assumed that a UE performs transmission related to LTE SL on frequency F1, and that the UE performs transmission related to NR SL on frequency F2. F1 and F2 may be positioned on an inter-frequency or inter-band. Alternatively, F1 and F2 may be positioned on an intra-frequency or intra-band. For example, as described above, in case a priority related to LTE SL transmission is higher than a priority related to NR SL transmission, the UE may omit NR SL transmission. In this case, as shown in the embodiment of FIG. 19, if synchronization related to LTE SL transmission does not align with synchronization related to NR SL transmission, the UE may have to drop the NR SL transmission that is being transmitted on two slots. This may lead to a waste of radio resources for SL communication. In the embodiment of FIG. 19, for convenience in the description, although the description has been made from a point of view of transmission, a similar problem may also occur in a point of view of reception.

Therefore, in order to resolve the above-described problem, the synchronization of NR SL transmission and LTE SL transmission need to be aligned.

Figure 20:
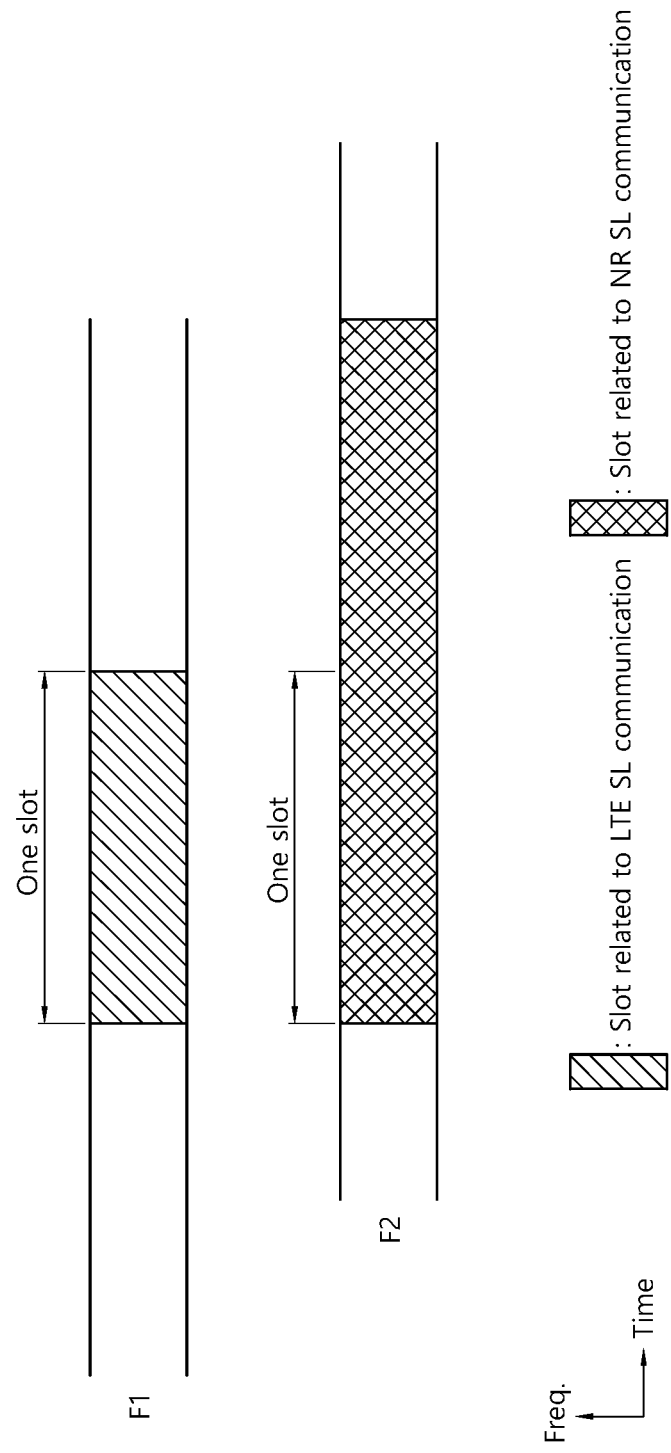
FIG. 20 shows an example of a synchronization related to NR SL communication aligning with a synchronization related to LTE SL communication, according to an embodiment of the present disclosure.

FIG. 20 shows an example of a synchronization related to NR SL communication aligning with a synchronization related to LTE SL communication, according to an embodiment of the present disclosure.

Referring to FIG. 20, the UE may obtain synchronization related to NR SL communication from synchronization related to LTE SL communication. That is, NR SL may align its synchronization to LTE SL. Therefore, since a priority related to LTE SL transmission is higher than a priority related to the NR SL transmission, even if the UE omits NR SL transmission, it will be sufficient for the UE to drop only the NR SL transmission being transmission on one slot. Therefore, the UE may efficiently use the radio resources for SL communication.

Figure 21:
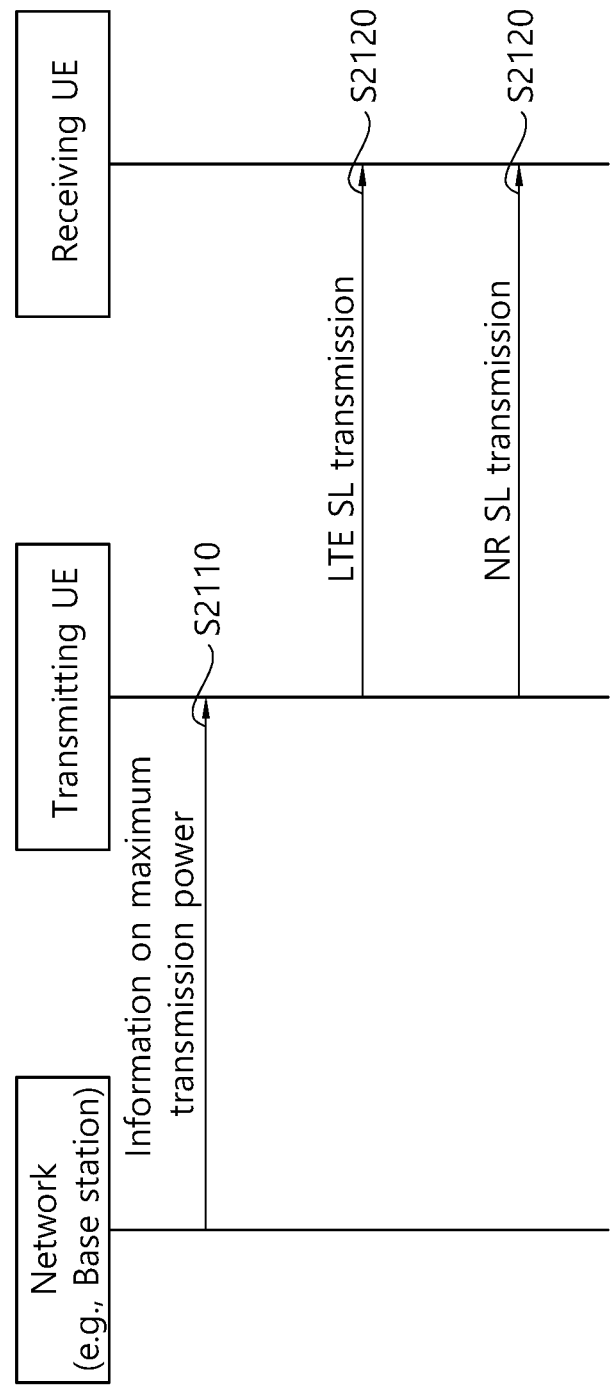
FIG. 21 shows a procedure for performing LTE SL transmission or NR SL transmission, by a UE, based on a maximum transmission power being configured for a carrier, according to an embodiment of the present disclosure.

FIG. 21 shows a procedure for performing LTE SL transmission or NR SL transmission, by a UE, based on a maximum transmission power being configured for a carrier, according to an embodiment of the present disclosure.

Referring to FIG. 21, in step S2110, a network (e.g., base station) may transmit information on a maximum transmission power related to LTE SL transmission and information on a maximum transmission power related to NR SL transmission to a UE. For example, the information on a maximum transmission power may be configured for a UE or may be preconfigured for the UE. For example, a first maximum transmission power may be configured for a channel and/or carrier related to LTE SL transmission, and a second maximum transmission power may be configured for a channel and/or carrier related to NR SL transmission. For example, a channel and/or carrier related to LTE SL transmission may be different from a channel and/or carrier related to NR SL transmission. For example, LTE SL transmission and NR SL transmission may be performed on an inter-band. For example, LTE SL transmission and NR SL transmission may be performed on an intra-band.

In step S2120, the UE may perform LTE SL transmission on a first channel and/or a first carrier based on a first maximum transmission power. Additionally, the UE may perform NR SL transmission on a second channel and/or a second carrier based on a second maximum transmission power.

According to the embodiment of the present disclosure, for a channel/carrier related to LTE SL transmission and a channel/carrier related to NR SL transmission, each maximum allowed power value may be designated. That is, for the channel/carrier related to LTE SL transmission and the channel/carrier related to NR SL transmission, static power allocation may be performed.

According to the embodiment of the present disclosure, transmission operation and/or reception operation of NR SL and LTE SL may be limited to align with one another within a time domain. For example, NR SL transmission and LTE SL reception, or NR SL reception and LTE SL transmission may not be allowed to partly or fully overlap one another within the time domain.

Meanwhile, in case LTE SL communication and NR SL communication are performed on different (continuous or non-continuous) channels within an intra-band, transmission of the UE on a specific channel may disable reception of the UE on another channel (that partly or fully overlaps within the time domain) to be performed. That is, due to a half-duplex problem, the transmission of the UE on a specific channel may disable the reception of the UE on another channel (that partly or fully overlaps within the time domain). Herein, for example, considering the above-described problem, according to the embodiment of the present disclosure, according to all or part of the following rules, transmission/reception operations between LTE SL and NR SL may be managed and/or controlled.

For example, at a time point where the UE performs an LTE SL reception operation, the UE may not perform an NR SL transmission operation. Alternatively, for example, at a time point where the UE performs an LTE SL transmission operation, the UE may not perform an NR SL reception operation. Alternatively, for example, at a time point where the UE performs an NR SL reception operation, the UE may not perform an LTE SL transmission operation. Alternatively, for example, at a time point where the UE performs an NR SL transmission operation, the UE may not perform an LTE SL reception operation. For example, a case where LTE SL reception has a higher priority than NL SL transmission may be a case where a priority of a message being received on LTE SL is higher than a priority of a message being transmitted on NR SL. For example, a case where LTE SL transmission has a higher priority than NL SL reception may be a case where a priority of a message being transmitted on LTE SL is higher than a priority of a message being received on NR SL. For example, a case where NL SL reception has a higher priority than LTE SL transmission may be a case where a priority of a message being received on NR SL is higher than a priority of a message being transmitted on LTE SL. For example, a case where NL SL transmission has a higher priority than LTE SL reception may be a case where a priority of a message being transmitted on NR SL is higher than a priority of a message being received on LTE SL. Herein, for example, the priority of a message is determined at least one of the above-described Rule 1, Rule 2, and/or Rule 3. For example, the above-described operations of the UE may include the UE avoiding a time point where the LTE SL reception operation is performed so as to select and/or reserve a resource related to NR SL transmission. For example, the above-described operations of the UE may include the UE avoiding a time point where a resource related to the LTE SL transmission is selected and/or reserved so as to perform an NR SL reception operation. For example, the above-described operations of the UE may include the UE avoiding a time point where the NR SL reception operation is performed so as to select and/or reserve a resource related to LTE SL transmission. For example, the above-described operations of the UE may include the UE avoiding a time point where a resource related to the NR SL transmission is selected and/or reserved so as to perform an LTE SL reception operation.

For example, at a time point where (LTE SL or NR SL) sensing related to transmission of a message having a (relatively) high priority is performed, the UE may avoid (NR SL or LTE_SL) transmission related to a message having a (relatively) low priority. Herein, for example, the priority of a message is determined at least one of the above-described Rule 1, Rule 2, and/or Rule 3.

For example, the UE may also perform LTE SL transmission and NR SL transmission by partly or fully overlapping the SL transmissions within the time domain. For example, in case a sum of a transmission power being required for LTE SL transmission and a transmission power being required for NR SL transmission does not exceed P_MAX, the UE may perform LTE SL transmission and NR SL transmission by partly or fully overlapping the SL transmissions within the time domain. Alternatively, for example, in case synchronous transmission of LTE SL and NR SL does not exceed RF capability, the UE may perform LTE SL transmission and NR SL transmission by partly or fully overlapping the SL transmissions within the time domain.

Meanwhile, in case of an NR system, a flexible slot format may be configured. Therefore, for example, in case of the NR system, the number of symbols constituting each of UL/DL/flexible resources in a slot may be configured to be partially or entirely different between slots or BWPs.

In the present specification, the SL slot may include at least any one of a slot in which a UE can perform sidelink communication, a slot in which the UE can perform V2X communication, a slot in which a resource pool for a sidelink is configured, and/or a slot in which a resource pool for V2X is configured. In the present specification, an SL symbol may include at least any one of a symbol in which the UE can perform sidelink communication, a symbol in which the UE can perform V2X communication, a symbol related to sidelink communication, and/or a symbol related to a sidelink. For example, the SL symbol may include at least any one of a UL symbol and/or a flexible (F) symbol.

Figure 22:
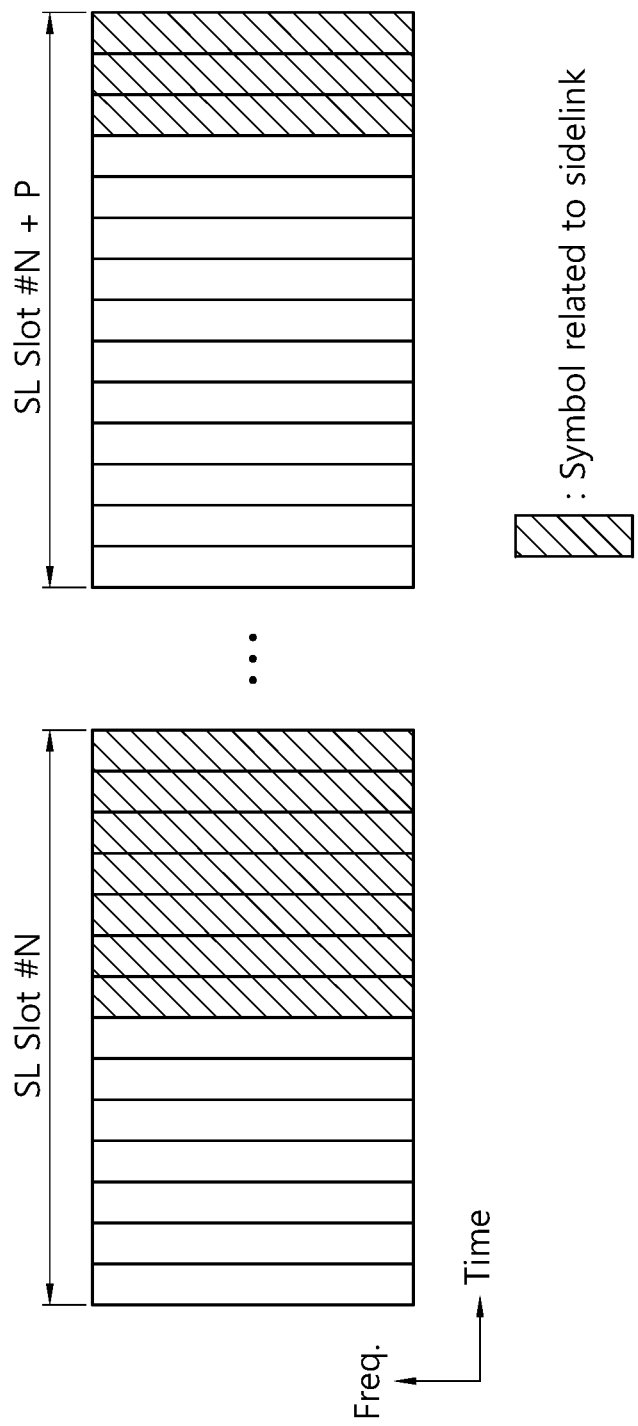
FIG. 22 is a diagram for describing a problem that may occur in accordance with a change in a number of symbols configuring an SL slot.

FIG. 22 is a diagram for describing a problem that may occur in accordance with a change in a number of symbols configuring an SL slot.

Referring to FIG. 22, it is assumed that a UE reserves a resource for sidelink transmission with a period P. In this case, a sub-channel consisting of 7 SL symbols may be present on a SL slot #N, whereas a sub-channel consisting of 3 SL symbols may be present on an SL slot #N+P. That is, the number of SL symbols may be changed between the SL slot #N and the SL slot #N+P.

In the above case, for example, there may be a problem in that a UE is unable to secure a resource amount required in message transmission at a specific timing.

Therefore, according to the embodiment of the present disclosure, in case part or all of the following conditions are satisfied, a transmitting UE may perform transmission on SL slot #N on a preconfigured exceptional pool. Alternatively, for example, in case part or all of the following conditions are satisfied, a transmitting UE may perform aperiodic transmission (e.g., ONE-SHOT transmission). Alternatively, for example, the transmitting UE may perform aperiodic transmission on another SL slot. For example, the transmitting UE may perform aperiodic transmission on another SL slot based on a randomly selected resource. Alternatively, for example, in case part or all of the following conditions are satisfied, the UE may omit sidelink transmission.

If a number of SL symbols configuring SL Slot #N is smaller than a number of symbols of a transmission resource, which is reserved by the UE, for example, if the number of SL symbols configuring SL Slot #N is smaller than the number of symbols of a transmission resource, which is reserved by the UE when performing resource re-reservation, and/or if a number of SL symbols configuring SL Slot #N is different from a number of symbols of a transmission resource, which is reserved by the UE, for example, if the number of SL symbols configuring SL Slot #N is different from the number of symbols of a transmission resource, which is reserved by the UE when performing resource re-reservation, and/or if a number of SL symbols configuring SL Slot #N is smaller than a number of symbols of a transmission resource, which is reserved by the UE, and, at the same time, if a difference value is larger than a preconfigured threshold value, for example, the number of SL symbols configuring SL Slot #N is smaller than the number of symbols of a transmission resource, which is reserved by the UE when performing resource re-reservation, and, at the same time, if a difference value is larger than a preconfigured threshold value, and/or if a (valid) coding rate that is derived based on a transmission resource, which is reserved by the UE, cannot be supported or derived by a number of SL symbols configuring SL Slot #N, for example, if a (valid) coding rate that is derived based on a transmission resource, which is reserved by the UE when performing resource re-reservation, cannot be supported or derived by a number of SL symbols configuring SL Slot #N, and/or if a (valid) coding rate that is lower than a preconfigured threshold value cannot be supported by a number of SL symbols configuring SL Slot #N, and/or if a (valid) coding rate that is derived based on a transmission resource, which is reserved by the UE, cannot be supported by a number of SL symbols configuring SL Slot #N, and, at the same time, if a difference value is larger than a preconfigured threshold value, and/or if a (valid) coding rate that is derived based on a transmission resource, which is reserved by the UE when performing resource re-reservation, cannot be supported by a number of SL symbols configuring SL Slot #N, and, at the same time, if a difference value is larger than a preconfigured threshold value.

For example, the threshold value may be configured independently or differently from at least one of a V2X resource pool, a BWP, a service type, a service requirement, a service priority, a message type, a message generation type, PPPP, PPPR, a logical channel priority, a logical channel identifier, and/or numerology.

Meanwhile, for example, resource allocation related to SL communication may be performed in accordance with the above-described rules and/or part of the rules described below in Table 5 in this specification.

TABLE 5

At least two sidelink resource allocation modes are defined for NR-V2X sidelink communication
Mode 1: Base station schedules sidelink resource(s) to be used by UE for sidelink transmission(s).
Mode 2: UE determines (i.e., base station does not schedule) sidelink transmission resource(s) within sidelink resources configured by base station/network or preconfigured sidelink resources.
Notes:
eNB control of NR sidelink and gNB control of LTE sidelink resources will be separately considered in corresponding agenda items.
Mode-2 definition covers potential sidelink radio-layer functionality or resource allocation sub-modes (subject to further refinement including merging of some or all of them) where UE autonomously selects sidelink resource for transmission, UE assists sidelink resource selection for other UE(s), UE is configured with NR configured grant (type-1 like) for sidelink transmission, and/or UE schedules sidelink transmissions of other UEs.
For the study of LTE-V2X and NR-V2X sidelink co-existence, at least the following scenarios are considered from the UE's perspective:
LTE sidelink and NR sidelink do not have any coordinated procedures.
LTE sidelink and NR sidelink have coordinated procedures and half-duplex constraints are assumed.

According to the embodiment of the present disclosure, the UE may transmit information to the base station through a predefined channel (e.g., PUSCH or PUCCH). For example, the information may be information for coexistence of NR SL and LTE SL. Herein, for example, the base station having received the information may efficiently allow coexistence of NR SL and LTE SL on different channels or the same channel. Herein, for example, the base station having received the information may efficiently allow coexistence of NR SL and LTE SL of different modes on different channels or the same channel. For example, the base station having received the information may efficiently allow coexistence of NR SL and LTE SL on different channels or a same channel. For example, the information may include at least one of the information listed below.

information on a location of a resource related to NR SL of Mode 2, e.g., information on a transmission resource or reception resource related to NR SL of Mode 2, and/or information on a transmission power related to NR SL of Mode 2, and/or information on a priority of a service related to NR SL of Mode 2, and/or information on PPPP related to NR SL of Mode 2, and/or information on PPPR related to NR SL of Mode 2, and/or information on a latency budget related to NR SL of Mode 2, and/or information on a location of a resource related to NR SL of Mode 1, e.g., information on a transmission resource or reception resource related to NR SL of Mode 1, and/or information on a transmission power related to NR SL of Mode 1, and/or information on a priority of a service related to NR SL of Mode 1, and/or information on PPPP related to NR SL of Mode 1, and/or information on PPPR related to NR SL of Mode 1, and/or information on a latency budget related to NR SL of Mode 1, and/or information on a location of a resource related to LTE SL of Mode 2, e.g., information on a transmission resource or reception resource related to LTE SL of Mode 2, and/or information on a transmission power related to LTE SL of Mode 2, and/or information on a priority of a service related to LTE SL of Mode 2, and/or information on PPPP related to LTE SL of Mode 2, and/or information on PPPR related to LTE SL of Mode 2, and/or information on a latency budget related to LTE SL of Mode 2, and/or information on a location of a resource related to LTE SL of Mode 1, e.g., information on a transmission resource or reception resource related to LTE SL of Mode 1, and/or information on a transmission power related to LTE SL of Mode 1, and/or information on a priority of a service related to LTE SL of Mode 1, and/or information on PPPP related to LTE SL of Mode 1, and/or information on PPPR related to LTE SL of Mode 1, and/or information on a latency budget related to LTE SL of Mode 1

Herein, for example, the UE may limitedly transmit information related to NR SL of Mode 2 and/or information related to NR SL of Mode 1 to an LTE base station related to LTE SL of Mode 1, an NR base station related to LTE SL of Mode 1, an LTE base station related to LTE SL of Mode 2, and/or an NR base station related to LTE SL of Mode 2.

Herein, for example, the UE may limitedly transmit information related to LTE SL of Mode 2 and/or information related to LTE SL of Mode 1 to an NR base station related to NR SL of Mode 1, an LTE base station related to NR SL of Mode 1, an NR base station related to NR SL of Mode 2, and/or an LTE base station related to NR SL of Mode 2.

Figure 23:
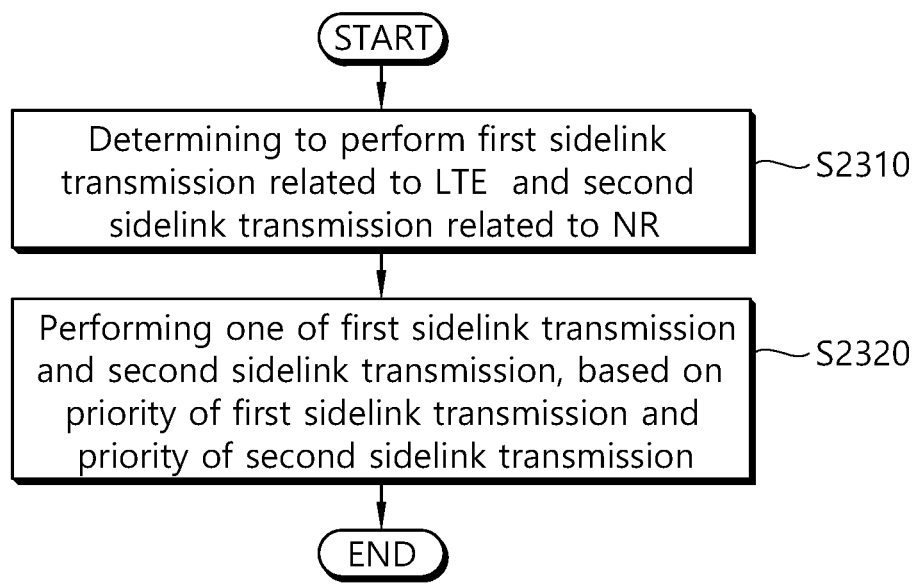
FIG. 23 shows a method for performing sidelink transmission, by a first device (100), according to an embodiment of the present disclosure.

FIG. 23 shows a method for performing sidelink transmission, by a first device (100), according to an embodiment of the present disclosure.

Referring to FIG. 23, in step S2310, the first device (100) may determine to perform a first sidelink transmission related to LTE and a second sidelink transmission related to NR. For example, the first sidelink transmission and the second sidelink transmission may partly or fully overlap within a time domain. For example, a sum of a transmission power for the first sidelink transmission and a transmission power for the second sidelink transmission may exceed a maximum transmission power of the first device (100).

In step S2320, the first device (100) may perform one of the first sidelink transmission and the second sidelink transmission based on a priority of the first sidelink transmission and a priority of the second sidelink transmission. For example, according to the various embodiments of this specification, the first device (100) may perform one of the first sidelink transmission and the second sidelink transmission. For example, the priority of the first sidelink transmission may include a priority of a packet related to the first sidelink transmission, and the priority of the second sidelink transmission may include a priority of a packet related to the second sidelink transmission.

For example, between the first sidelink transmission and the second sidelink transmission, only the sidelink transmission having a high priority may be performed. For example, between the first sidelink transmission and the second sidelink transmission, the sidelink transmission having a low priority may be omitted.

For example, the priority of the first sidelink transmission may be configured to be higher than the priority of the second sidelink transmission. For example, a priority of a sidelink transmission related to an aperiodic message may be configured to be higher than a priority of a sidelink transmission related to a periodic message. For example, a priority of a sidelink transmission performed through a carrier having a small CBR value may be configured to be higher than a priority of a sidelink transmission performed through a carrier having a large CBR value. For example, a sidelink transmission related to a preconfigured channel or signal may be configured to have a high priority.

For example, a maximum transmission power for a first carrier related to the first sidelink transmission and a maximum transmission power for a second carrier related to the second sidelink transmission may be configured for the first device (100). For example, a minimum transmission power for a first carrier related to the first sidelink transmission and a minimum transmission power for a second carrier related to the second sidelink transmission may be configured for the first device (100).

For example, synchronization related to the second sidelink transmission may be obtained from synchronization related to the first sidelink transmission. For example, the first sidelink transmission and the second sidelink transmission may be performed on different carriers.

The proposed method may be performed by various device described in this specification. Firstly, a processor (102) of the first device (100) may determine to perform a first sidelink transmission related to LTE and a second sidelink transmission related to NR. And, the processor (102) of the first device (100) may control a transceiver (106) so that one of the first sidelink transmission and the second sidelink transmission can be performed, based on a priority of the first sidelink transmission and a priority of the second sidelink transmission.

Examples for the aforementioned proposed scheme can be included as one of implementation methods of the present disclosure, and thus can be apparently regarded as a sort of proposed methods. In addition, although the aforementioned proposed schemes can be independently implemented, it is also possible to be implemented by combining (or merging) some proposed schemes. For example, although the proposed method is described in the present disclosure based on the 3GPP system for convenience of explanation, a scope of a system for applying the proposed method may be extended to other systems other than the 3GPP system.

Hereinafter, an apparatus to which the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 24:
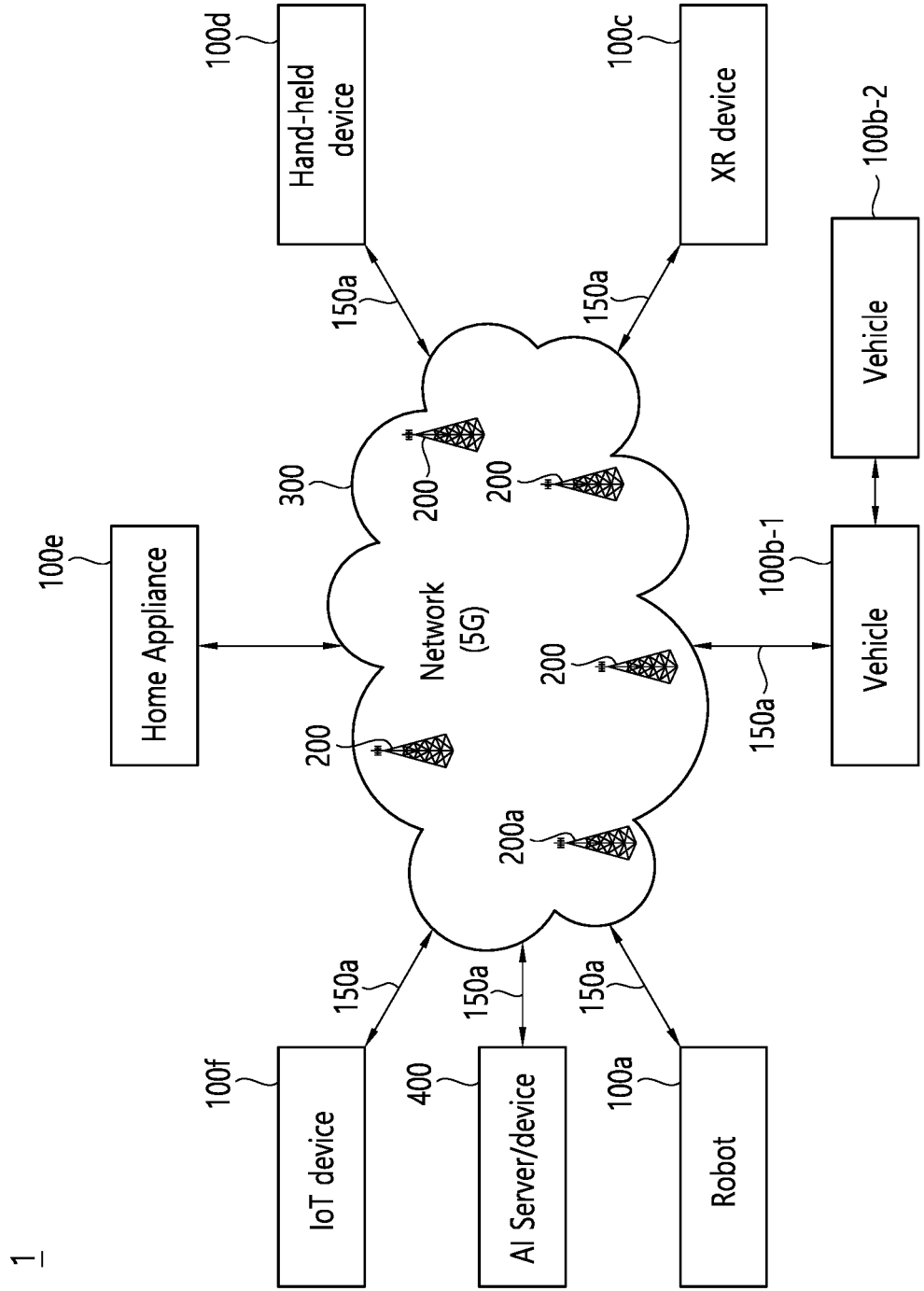
FIG. 24 shows a communication system (1) applied to the present disclosure.

FIG. 24 shows a communication system (1) applied to the present disclosure.

Referring to FIG. 24, a communication system (1) applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b) may be established between the wireless devices (100a~100f)/BS (200), or BS (200)/wireless devices (100a~100f). Herein, the wireless communication/connections (150a, 150b) may be established through various RATs (e.g., 5G NR) such as uplink/downlink communication (150a), sidelink communication (150b) (or, D2D communication), or inter BS communication (e.g., relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 25:
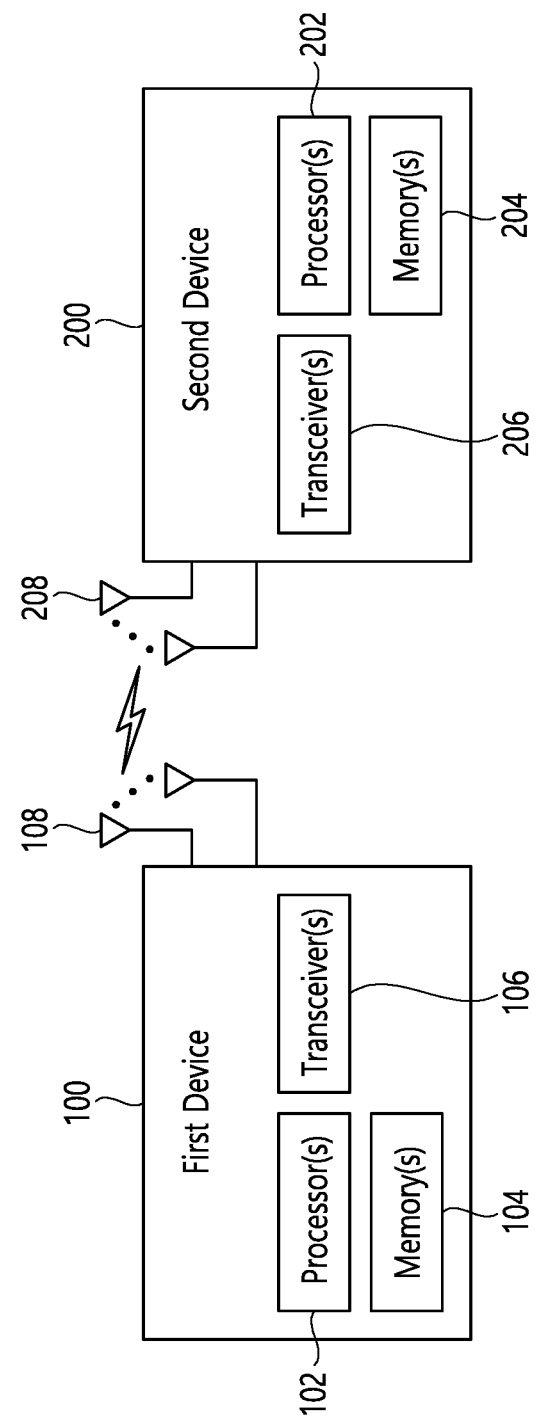
FIG. 25 shows wireless devices applicable to the present disclosure.

FIG. 25 shows wireless devices applicable to the present disclosure.

Referring to FIG. 25, a first wireless device (100) and a second wireless device (200) may transmit radio signals through a variety of RATs (e.g., LTE and NR). Herein, {the first wireless device (100) and the second wireless device (200)} may correspond to {the wireless device (100x) and the BS (200)} and/or {the wireless device (100x) and the wireless device (100x)} of FIG. 24.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store a variety of information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/signals in the memory(s) (204). The memory(s) (204) may be connected to the processor(s) (202) and may store a variety of information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Units (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and acquire the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels etc., from RF band signals into baseband signals in order to process received user data, control information, radio signals/channels, etc., using the one or more processors (102, 202). The one or more transceivers (106, 206) may convert the user data, control information, radio signals/channels, etc., processed using the one or more processors (102, 202) from the base band signals into the RF band signals. To this end, the one or more transceivers (106, 206) may include (analog) oscillators and/or filters.

Figure 26:
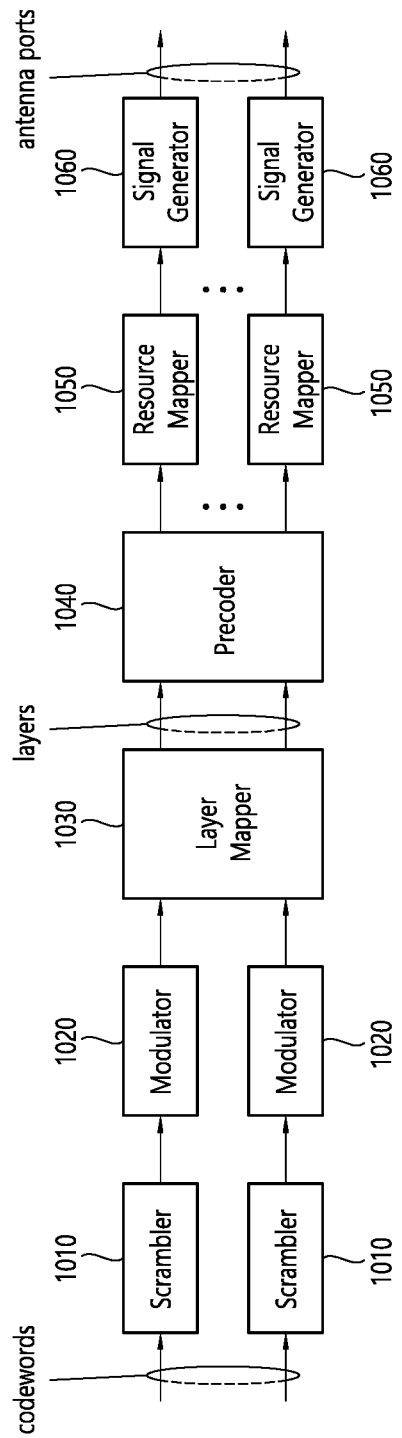
FIG. 26 shows a signal process circuit for a transmission signal.

FIG. 26 shows a signal process circuit for a transmission signal.

Referring to FIG. 26, a signal processing circuit (1000) may include scramblers (1010), modulators (1020), a layer mapper (1030), a precoder (1040), resource mappers (1050), and signal generators (1060). An operation/function of FIG. 26 may be performed, without being limited to, the processors (102, 202) and/or the transceivers (106, 206) of FIG. 25. Hardware elements of FIG. 26 may be implemented by the processors (102, 202) and/or the transceivers (106, 206) of FIG. 25. For example, blocks 1010~1060 may be implemented by the processors (102, 202) of FIG. 25. Alternatively, the blocks 1010 to 1050 may be implemented by the processors (102, 202) of FIG. 25 and the block 1060 may be implemented by the transceivers (106, 206) of FIG. 25.

Codewords may be converted into radio signals via the signal processing circuit (1000) of FIG. 26. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 26. For example, the wireless devices (e.g., 100, 200 of FIG. 25) may receive radio signals from the exterior through the antenna ports/transceivers. The received radio signals may be converted into baseband signals through signal restorers.

To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 27:
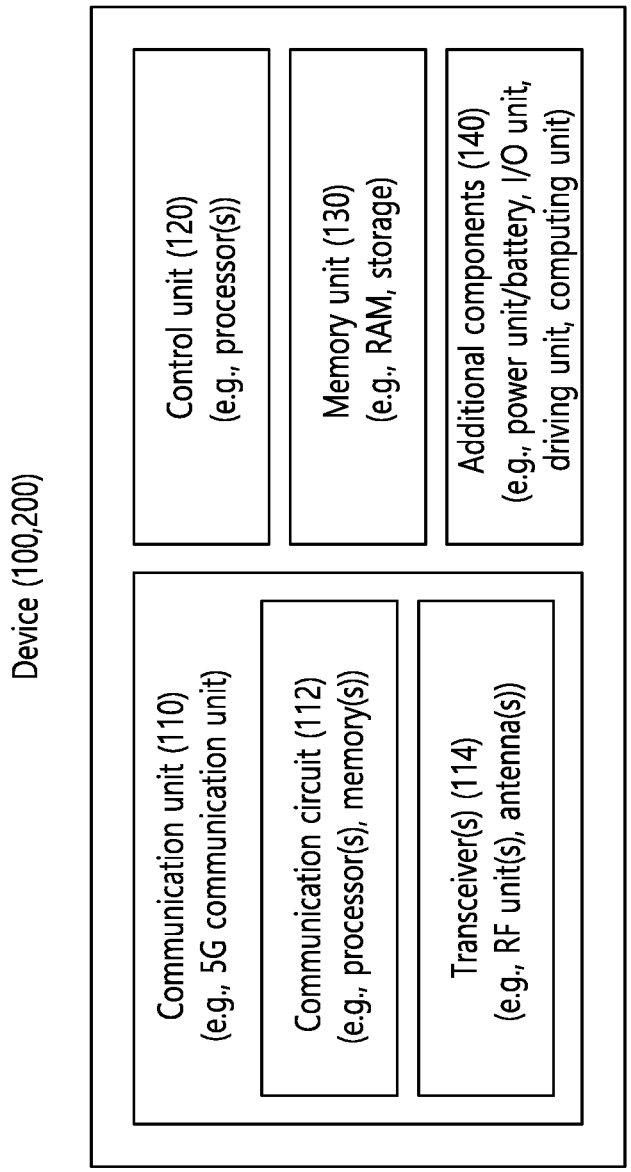
FIG. 27 shows another example of a wireless device applied to the present disclosure.

FIG. 27 shows another example of a wireless device applied to the present disclosure. The wireless device may be implemented in various forms according to a use-case/service (refer to FIG. 24 and FIGS. 26 to 31).

Referring to FIG. 27, wireless devices (100, 200) may correspond to the wireless devices (100, 200) of FIG. 25 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 25. For example, the transceiver(s) (114) may include the one or more transceivers (106, 206) and/or the one or more antennas (108, 208) of FIG. 25. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 24), the vehicles (100b-1, 100b-2 of FIG. 24), the XR device (100c of FIG. 24), the hand-held device (100d of FIG. 24), the home appliance (100e of FIG. 24), the IoT device (100f of FIG. 24), a digital broadcast terminal, a hologram device, a public safety device, an MTC device, a medicine device, a fintech device (or a finance device), a security device, a climate/environment device, the AI server/device (400 of FIG. 24), the BSs (200 of FIG. 24), a network node, etc. The wireless device may be used in a mobile or fixed place according to a use-example/service.

In FIG. 27, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 27 will be described in detail with reference to the drawings.

Figure 28:
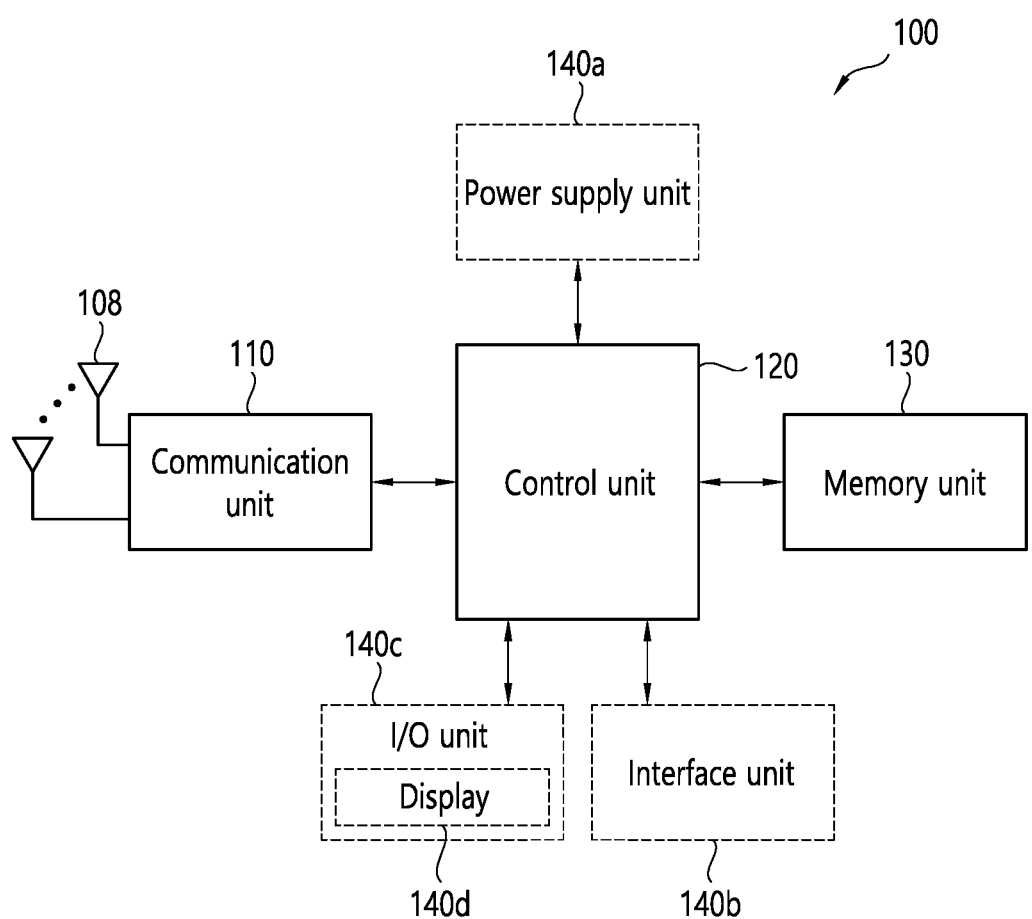
FIG. 28 shows a hand-held device applied to the present disclosure.

FIG. 28 shows a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 28, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a~140c correspond to the blocks 110~130/140 of FIG. 27, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, etc. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may acquire information/signals (e.g., touch, text, voice, images, or video) input by a user and the acquired information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 29:
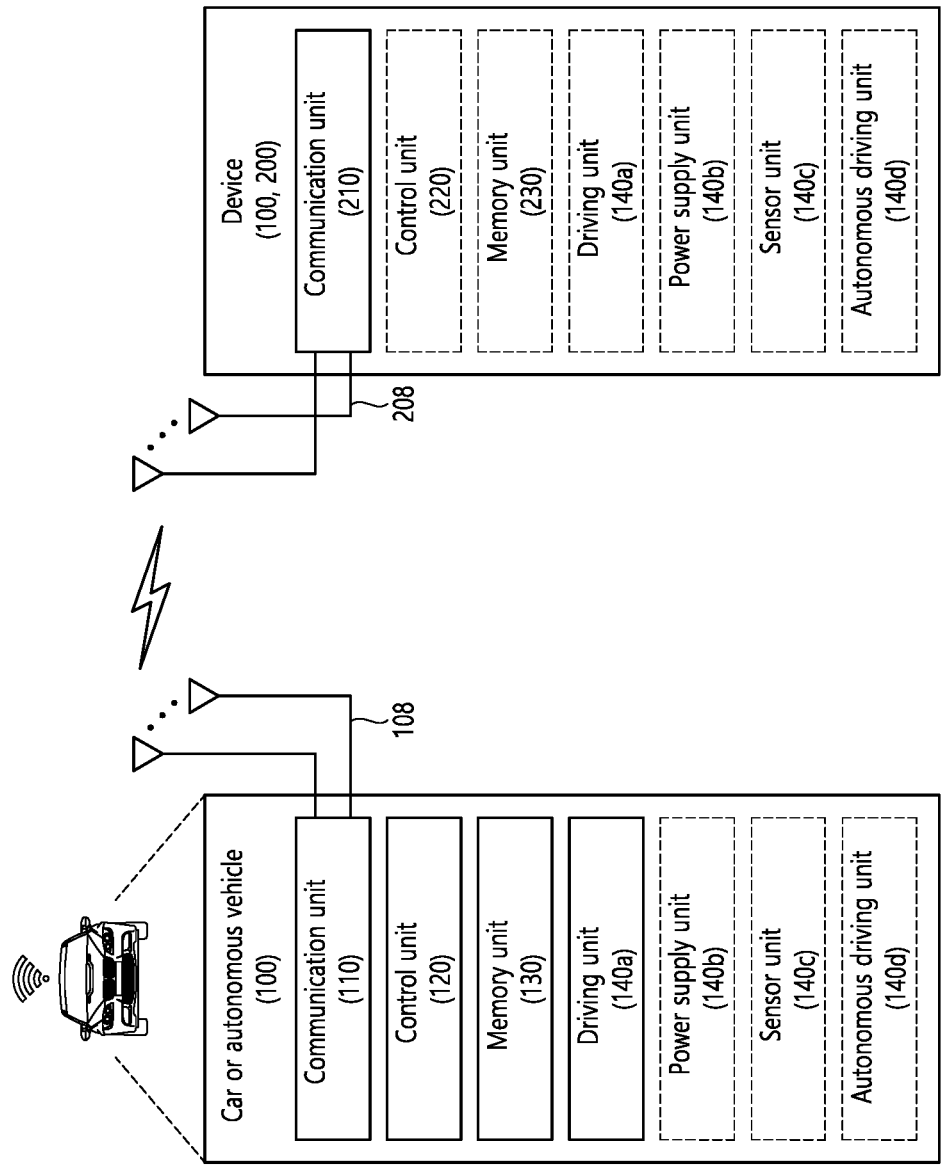
FIG. 29 shows a vehicle or an autonomous driving vehicle applied to the present disclosure.

FIG. 29 shows a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 29, a vehicle or autonomous driving vehicle (100) may include an antenna unit (108), a communication unit (110), a control unit (120), a driving unit (140*a*), a power supply unit (140*b*), a sensor unit (140*c*), and an autonomous driving unit (140*d*). The antenna unit (108) may be configured as a part of the communication unit (110). The blocks 110/130/140*a*~140*d* correspond to the blocks 110/130/140 of FIG. 27, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous driving vehicle (100). The control unit (120) may include an Electronic Control Unit (ECU). The driving unit (140*a*) may cause the vehicle or the autonomous driving vehicle (100) to drive on a road. The driving unit (140*a*) may include an engine, a motor, a powertrain, a wheel, a brake, a steering device, etc. The power supply unit (140*b*) may supply power to the vehicle or the autonomous driving vehicle (100) and include a wired/wireless charging circuit, a battery, etc. The sensor unit (140*c*) may acquire a vehicle state, ambient environment information, user information, etc. The sensor unit (140*c*) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit (140*d*) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, etc., from an external server. The autonomous driving unit (140*d*) may generate an autonomous driving path and a driving plan from the obtained data. The control unit (120) may control the driving unit (140*a*) such that the vehicle or the autonomous driving vehicle (100) may move along the autonomous driving path according to the driving plan (e.g., speed/direction control). In the middle of autonomous driving, the communication unit (110) may aperiodically/periodically acquire recent traffic information data from the external server and acquire surrounding traffic information data from neighboring vehicles. In the middle of autonomous driving, the sensor unit (140*c*) may obtain a vehicle state and/or surrounding environment information. The autonomous driving unit (140*d*) may update the autonomous driving path and the driving plan based on the newly obtained data/information. The communication unit (110) may transfer information on a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 30:
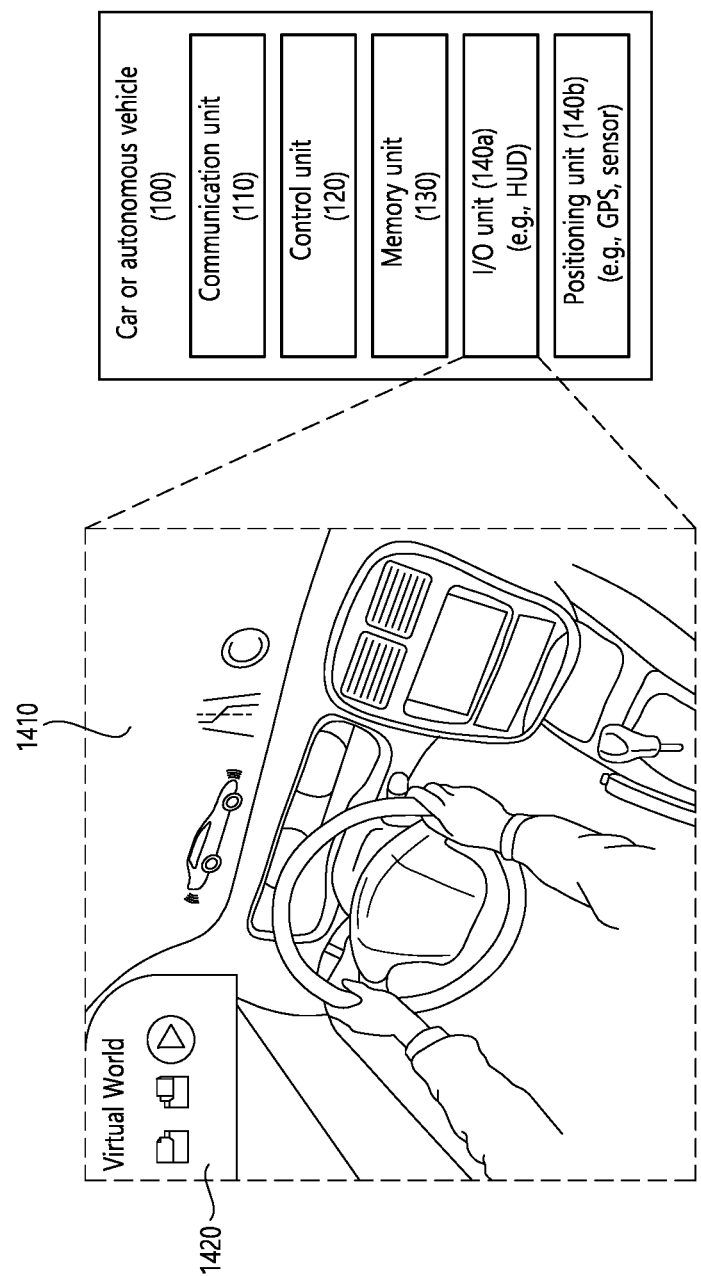
FIG. 30 shows a vehicle applied to the present disclosure.

FIG. 30 shows a vehicle applied to the present disclosure. The vehicle may be implemented as a transport means, an aerial vehicle, a ship, etc.

Referring to FIG. 30, a vehicle (100) may include a communication unit (110), a control unit (120), a memory unit (130), an I/O unit (140*a*), and a positioning unit (140*b*). Herein, the blocks 110 to 130/140*a*~140*b* correspond to blocks 110 to 130/140 of FIG. 27.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140*a*) may output an AR/VR object based on information within the memory unit (130). The I/O unit (140*a*) may include a HUD. The positioning unit (140*b*) may acquire information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140*b*) may include a GPS and various sensors.

As an example, the communication unit (110) of the vehicle (100) may receive map information and traffic information from an external server and store the received information in the memory unit (130). The positioning unit (140*b*) may obtain the vehicle position information through the GPS and various sensors and store the obtained information in the memory unit (130). The control unit (120) may generate a virtual object based on the map information, traffic information, and vehicle position information and the I/O unit (140*a*) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140*a*). In addition, the control unit (120) may broadcast a warning message regarding driving abnormity to neighboring vehicles through the communication unit (110). According to situation, the control unit (120) may transmit the vehicle position information and the information on driving/vehicle abnormality to related organizations.

Figure 31:
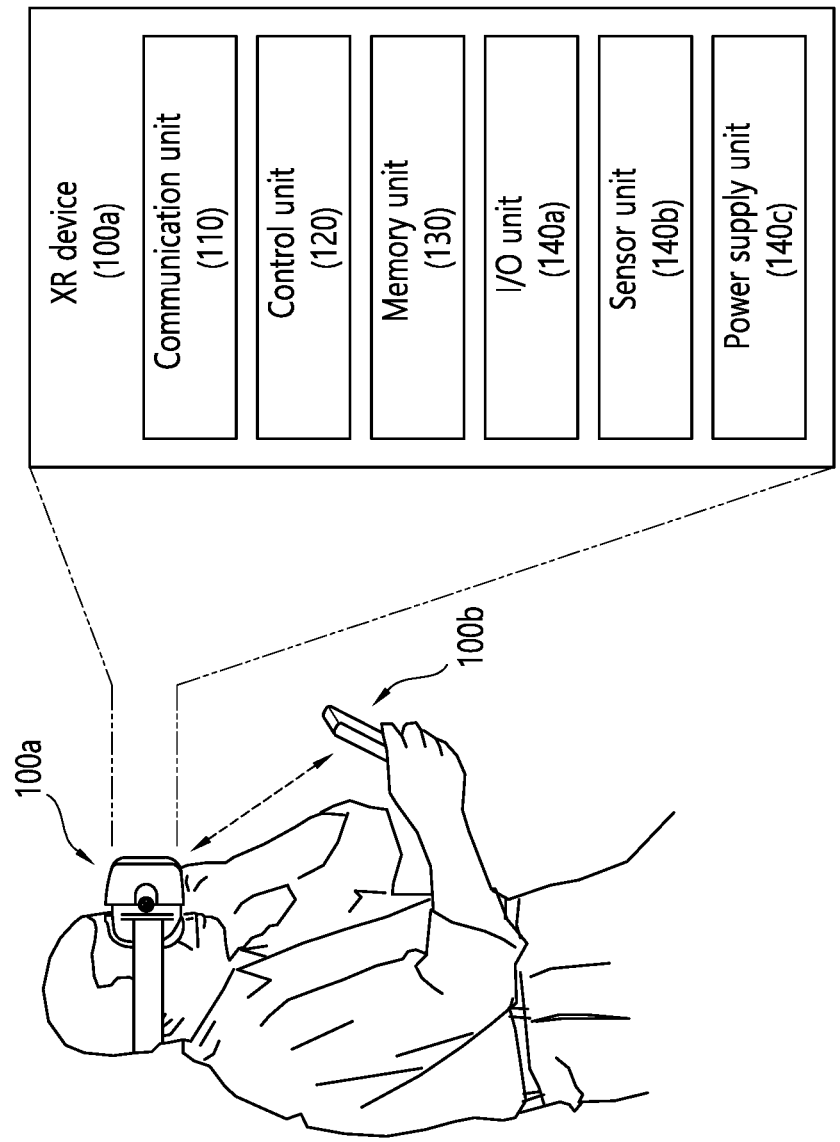
FIG. 31 shows an XR device applied to the present disclosure.

FIG. 31 shows an XR device applied to the present disclosure. The XR device may be implemented by an HMD, a HUD mounted in a vehicle, a television, a smartphone, a computer, a wearable device, a home appliance, a digital signage, a vehicle, a robot, etc.

Referring to FIG. 31, an XR device (100*a*) may include a communication unit (110), a control unit (120), a memory unit (130), an I/O unit (140*a*), a sensor unit (140*b*), and a power supply unit (140*c*). Herein, the blocks 110 to 130/140*a*~140*c* correspond to the blocks 110 to 130/140 of FIG. 27, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100*a*). For example, the control unit (120) may be configured to control and/or perform procedures such as video/image acquisition, (video/image) encoding, and metadata generation and processing. The memory unit (130) may store data/parameters/programs/code/commands needed to drive the XR device (100a)/generate XR object. The I/O unit (140a) may obtain control information and data from the exterior and output the generated XR object. The I/O unit (140a) may include a camera, a microphone, a user input unit, a display unit, a speaker, and/or a haptic module. The sensor unit (140b) may obtain an XR device state, surrounding environment information, user information, etc. The sensor unit (140b) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140c) may supply power to the XR device (100a) and include a wired/wireless charging circuit, a battery, etc.

For example, the memory unit (130) of the XR device (100a) may include information (e.g., data) needed to generate the XR object (e.g., an AR/VR/MR object). The I/O unit (140a) may receive a command for manipulating the XR device (100a) from a user and the control unit (120) may drive the XR device (100a) according to a driving command of a user. For example, when a user desires to watch a film or news through the XR device (100a), the control unit (120) transmits content request information to another device (e.g., a hand-held device (100b)) or a media server through the communication unit (130). The communication unit (130) may download/stream content such as films or news from another device (e.g., the hand-held device (100b)) or the media server to the memory unit (130). The control unit (120) may control and/or perform procedures such as video/image acquisition, (video/image) encoding, and metadata generation/processing with respect to the content and generate/output the XR object based on information on a surrounding space or a real object obtained through the I/O unit (140a)/sensor unit (140b).

The XR device (100a) may be wirelessly connected to the hand-held device (100b) through the communication unit (110) and the operation of the XR device (100a) may be controlled by the hand-held device (100b). For example, the hand-held device (100b) may operate as a controller of the XR device (100a). To this end, the XR device (100a) may obtain information on a 3D position of the hand-held device (100b) and generate and output an XR object corresponding to the hand-held device (100b).

Figure 32:
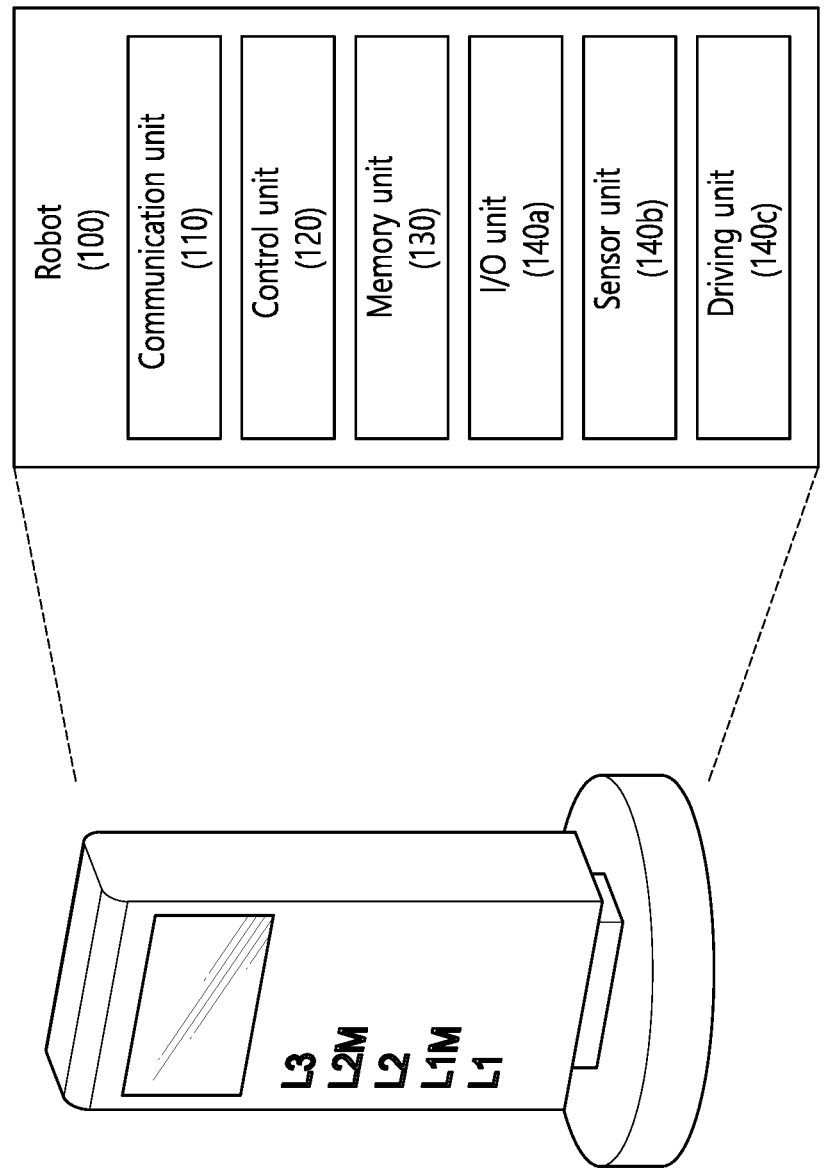
FIG. 32 shows a robot applied to the present disclosure.

FIG. 32 shows a robot applied to the present disclosure. The robot may be categorized into an industrial robot, a medical robot, a household robot, a military robot, etc., according to a used purpose or field.

Referring to FIG. 32, a robot (100) may include a communication unit (110), a control unit (120), a memory unit (130), an I/O unit (140a), a sensor unit (140b), and a driving unit (140c). Herein, the blocks 110 to 130/140a~140c correspond to the blocks 110 to 130/140 of FIG. 27, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140a) may obtain information from the exterior of the robot (100) and output information to the exterior of the robot (100). The I/O unit (140a) may include a camera, a microphone, a user input unit, a display unit, a speaker, and/or a haptic module. The sensor unit (140b) may obtain internal information of the robot (100), surrounding environment information, user information, etc. The sensor unit (140b) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit (140c) may perform various physical operations such as movement of robot joints. In addition, the driving unit (140c) may cause the robot (100) to travel on the road or to fly. The driving unit (140c) may include an actuator, a motor, a wheel, a brake, a propeller, etc.

Figure 33:
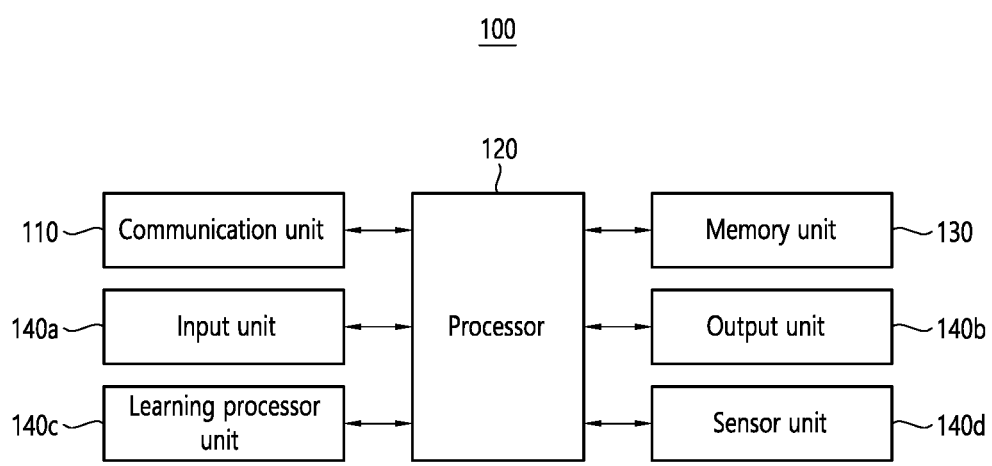
FIG. 33 shows an AI device applied to the present disclosure.

FIG. 33 shows an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 33, an AI device (100) may include a communication unit (110), a control unit (120), a memory unit (130), an I/O unit (140a/140b), a learning processor unit (140c), and a sensor unit (140d). The blocks 110 to 130/140a~140d correspond to blocks 110 to 130/140 of FIG. 27, respectively.

The communication unit (110) may transmit and receive wired/radio signals (e.g., sensor information, user input, learning models, or control signals) to and from external devices such as other AI devices (e.g., 100x, 200, 400 of FIG. 24) or an AI server (200) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 24). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may acquire various types of data from the exterior of the AI device (100). For example, the input unit (140a) may acquire learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data. The learning processor unit (140c) may perform AI processing together with the learning processor unit of the AI server (400 of FIG. 24). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

What is claimed is:

1. A method for performing, by a first apparatus, wireless communication, the method comprising:
   determining to perform an evolved-universal terrestrial radio access (E-UTRA)-based first sidelink transmission and an NR-radio-access-based second sidelink transmission; and
   performing one of the first sidelink transmission of a first channel or a first signal or the second sidelink transmission of a second channel or a second signal with a highest priority, based on (i) the first sidelink transmission and the second sidelink transmission overlapping in time, and (ii) a priority of the first channel or the first signal being transmitted on the first sidelink transmission and (iii) a priority of the second channel or the second signal being transmitted on the second sidelink transmission,
   wherein one of the first channel or the first signal or the second channel or the second signal having a lower priority is not performed, and
   wherein a subframe boundary of the second sidelink transmission is aligned with a subframe boundary of the first sidelink transmission.

2. The method of claim 1, wherein the first sidelink transmission includes transmission of an E-UTRA based sidelink synchronization signal, and a priority related to the E-UTRA-based sidelink synchronization signal is indicated by a higher layer for the first apparatus.

3. The method of claim 1, wherein the second sidelink transmission includes transmission of an NR-radio-access-based sidelink-synchronization signal/physical sidelink broadcast channel (S-SS/PSBCH) block, and
   wherein a priority related to the way NR-radio-access-based S-SS/PSBCH block is configured for the first apparatus.

4. The method of claim 3, wherein the priority related to the NR-radio-access-based S-SS/PSBCH block is indicated by a higher layer of the first apparatus.

5. The method of claim 1, wherein a maximum transmit power for a first carrier related to the first sidelink transmission and a maximum transmit power for a second carrier related to the second sidelink transmission are configured for the first apparatus.

6. The method of claim 1, wherein a time synchronization related to the second sidelink transmission is obtained from a time synchronization related to the first sidelink transmission.

7. The method of claim 1, wherein based on the first sidelink transmission and the second sidelink transmission being divided in time, the subframe boundary of the second sidelink transmission is aligned with the subframe boundary of the first sidelink transmission.

8. The method of claim 1, wherein a sum of a transmit power for the first sidelink transmission and a transmit power for the second sidelink transmission exceeds a maximum transmit power of the first apparatus.

9. The method of claim 1, wherein the priority of the first channel includes a priority of a packet related to the first channel, and the priority of the second channel includes a priority of a packet related to the second channel.

10. The method of claim 1, wherein the priority of the first channel or the first signal is configured higher than the priority of the second channel or the second signal.

11. The method of claim 1, wherein a priority of an aperiodic message related to a sidelink transmission is configured higher than a priority of a periodic message related to a sidelink transmission.

12. The method of claim 1, wherein a priority of a channel or a signal being transmitted on a sidelink transmission through a carrier having a low channel busy ratio (CBR) value is configured higher than a priority of a channel or a signal being transmitted on a sidelink transmission through a carrier having a high CBR value.

13. The method of claim 1, wherein a priority of a pre-configured channel or a pre-configured signal being transmitted on a sidelink transmission is configured higher than a priority of a non-pre-configured channel or a non-pre-configured signal being transmitted on a sidelink transmission.

14. The method of claim 1, wherein the first sidelink transmission and the second sidelink transmission are performed on different carriers.

15. The method of claim 1, wherein the first sidelink transmission includes transmission of an E-UTRA-based sidelink synchronization signal, and
   wherein a priority related to the E-UTRA-based sidelink synchronization signal is configured for the first apparatus.

16. A first apparatus for performing wireless communication, the first apparatus comprising:
   one or more memories storing instructions;
   one or more transceivers; and
   one or more processors connected to the one or more memories and the one or more transceivers, wherein the one or more processors execute the instructions to:
   determine to perform an evolved-universal terrestrial radio access (E-UTRA)-based first sidelink transmission and an NR-radio-access-based second sidelink transmission; and
   perform one of the first sidelink transmission of a first channel or a first signal or the second sidelink transmission of a second channel or a second signal with a highest priority, based on (i) the first sidelink transmission and the second sidelink transmission overlapping in time, and (ii) a priority of the first channel or the first signal being transmitted on the first sidelink transmission and (iii) a priority of the second channel or the second signal being transmitted on the second sidelink transmission, wherein one of the first channel or the first signal or the second channel or the second signal having a lower priority is not performed, and wherein a subframe boundary of the second sidelink transmission is aligned with a subframe boundary of the first sidelink transmission.

17. An apparatus configured to control a first user equipment (UE), the apparatus comprising:

one or more processors; and one or more memories connected to the one or more processors and storing instructions, wherein the one or more processors execute the instructions to:

determine to perform an evolved-universal terrestrial radio access (E-UTRA)-based first sidelink transmission and an NR-radio-access-based second sidelink transmission; and perform one of the first sidelink transmission of a first channel or a first signal or the second sidelink transmission of a second channel or a second signal with a highest priority, based on (i) the first sidelink transmission and the second sidelink transmission overlapping in time, and (ii) a priority of the first channel or the first signal being transmitted on the first sidelink transmission and (iii) a priority of the second channel or the second signal being transmitted on the second sidelink transmission, wherein one of the first channel or the first signal or the second channel of the second signal having a lower priority is not performed, and wherein a subframe boundary of the second sidelink transmission is aligned with a subframe boundary of the first sidelink transmission.

* * * * *